US006961857B1

(12) United States Patent
Floryanzia

(10) Patent No.: US 6,961,857 B1
(45) Date of Patent: Nov. 1, 2005

(54) AUTHENTICATING ENDPOINTS OF A VOICE OVER INTERNET PROTOCOL CALL CONNECTION

(75) Inventor: Tyrone Floryanzia, Research Triangle Park, NC (US)

(73) Assignee: Cisco Technology, Inc., San Jose, CA (US)

( * ) Notice: Subject to any disclaimer, the term of this patent is extended or adjusted under 35 U.S.C. 154(b) by 819 days.

(21) Appl. No.: 09/676,265

(22) Filed: Sep. 28, 2000

(51) Int. Cl.[7] .................................................. H04L 9/00
(52) U.S. Cl. ....................................... 713/201; 713/168
(58) Field of Search ................................. 713/168, 201

(56) References Cited

OTHER PUBLICATIONS http://www.cisco.com/warp/public/788/voip/gw__security.html.*
http://www.cisco.com/univercd/cc/td/doc/product/software/ios120/120newft/120t/120t6/gwsecacc.htm.*
Menezes et al., Handbook of Applied Cryptography, 1997, CRC Press LLC, pp. 397-405.*
"ITU, IETF achieve single standard to bridge circuit-switched and IP-based networks," Press Release, International Telecommunication Union, Aug. 4, 2000.
"From competition to cooperation: the road to e-commerce," ITU Plenipotentiary Conference, Oct. 12, 1998.
ITU-T Recommendation H.235, "Security and encryption for H-Series (H.323 and other H.245-based) multimedia terminals," Table of Contents and Summary, Feb., 1998.
ITU-T Recommendation H.323, "Packet-based multimedia communication systems," Table of Contents and Summary, Feb., 1998.
S. Kotha, "Deploying H.323 Applications in Cisco Networks," Cisco Systems, Inc., Jul. 1, 2000.
Overview of H.323, Cisco Systems, Inc., Dec. 18, 2000.
Cisco H.235 Accounting and Security Enhancements for Cisco Gateways, Cisco Systems, Inc., Dec. 13, 1999.
Cisco H.323 Gateway Security and Accounting Enhancements, Cisco Systems, Inc., Dec. 13, 1999.

* cited by examiner

*Primary Examiner*—Gregory Morse
*Assistant Examiner*—Jacob Lipman
(74) *Attorney, Agent, or Firm*—Hickman Palermo Truong & Becker, LLP

(57) ABSTRACT

A method and apparatus for securely establishing voice over Internet Protocol calls are disclosed. In a Registration Security approach, a Gatekeeper sends an Access Token in all Registration Request messages. The Access Token contains information that authenticates the Gateway to the Gatekeeper. The Gatekeeper formats a message to an authentication server that will authenticate the information contained in the token, and the server responds with either an Access-Accept or Access-Reject message. The Gatekeeper responds to the Gateway with either a Registration Confirm message or a Registration Reject message. If a call is then placed from a successfully authenticated Gateway, that Gateway generates a new Access Token that is identical to the one generated during registration, except for the timestamp. The Gatekeeper uses the authentication server to authenticate the originating gateway, before sending the designation side Access Confirm message. As a result, a non-authenticated endpoint that knows a Gateway's address cannot use the Gateway address to circumvent security and access the telephone network to place unauthorized calls or free calls. In Admission or Per-Call Security, a Gateway is also required to include an Access Token in all originating side Admission Request messages. Such token contains information that identifies the user of the Gateway to the Gatekeeper, based on an account number and PIN obtained from the user. The Access Token is authenticated in the manner described above.

41 Claims, 23 Drawing Sheets

AUTHENTICATING ENDPOINTS OF A VOICE OVER INTERNET PROTOCOL CALL CONNECTION

FIELD OF INVENTION

The present invention generally relates to transmission of voice calls or voice information over packet-switched data networks. The invention relates more specifically to securely authenticating endpoints of a voice-over-Internet Protocol call connection.

BACKGROUND OF THE INVENTION

Internet Protocol ("IP") telephony or voice over IP ("VoIP") generally relates to transmission of voice calls or voice information over packet-switched data networks that use IP as a datagram protocol. VoIP systems have recently attracted wide interest because they offer significant advantages over conventional circuit-switched telephone communications. For example, VoIP systems can handle more calls, do not need a separate switched circuit for each call, do not require a specified amount of bandwidth per call, and do not require a large number of geographically distributed central call switching offices, as with the public switched telephone network.

One favored protocol suite for supporting VoIP communications is the H.323 recommendations published by the International Telecommunications Union (ITU). The H.323 recommendations rely on many other supporting protocols to complete operations. For example, recommendation H.235 defines secure authentication of endpoint nodes of a VoIP call.

FIG. 1 is a block diagram that illustrates a model of various VoIP functions in VoIP physical entities, for the purpose of providing more clarity to the general context of packet telephony, and based on J. Vandenameele, "Requirements for the Reference Point ('N') between Media Gateway Controller and Media Gateway," Draft-vandenameele-tiphon-archgway-deomp-00.txt, November 1998.

In the model of FIG. 1, a Gateway 110 comprises a Media Gateway Controller (MGC) 112, Media Gateway (MG) 116, and Signaling Gateway (SG) 114. Gateway 110 is the node in the network that interfaces an IP-based network and the public switched telephony network. It provides two-way, real-time communications interfaces between the IP-based network and the telephony network. Each Gateway supports several end users having telephones.

Generally, Gateway 110 is a node on a local area network (LAN) that communicates with a terminal 108 or other terminals that are attached to other networks. If one of the terminals does not conform to H.323, Gateway 110 performs translation of the transmission formats between the terminals. One Gateway 110 can interwork with another Gateway, for example, when Gateways have different owners or operators. In addition, the Gateway can operate with other ITU switched circuit networks; the PSTN; narrowband ISDN (N-ISDN); and broadband ISDN (B-ISDN, an ATM-based network. The Gateway 110 also can operate as an H.323 Multipoint Control Unit, to support conferencing between three or more terminals and Gateways. Working in conjunction with Gatekeepers 102A, 102B, Gateway 110 can set up and clear calls on the LAN and switched circuit networks.

Media Gateway 116 provides mapping and translation functions between an IP network and the PSTN. For example, Media Gateway 116 might translate speech that is encoded in one manner into speech that is encoded in another manner. Such operations are known as stream conditioning and may include echo cancellation and other functions. For traffic originating from the IP network, packet media termination is performed, since packets do not operate on the telephony side. Therefore, packets are mapped into telephony bearer channels. The opposite operations occur when traffic emanates from the telephony network. Media Gateway 116 is also responsible for support services such as playing announcements, and tone generation as necessary.

Signaling Gateway 114 is responsible for signaling operation and provides, for example, interworking of H.323 and Switching System 7 (SS7) ISUP signaling operations. For example, it might translate an H.323 SETUP message coming from a Gatekeeper 102A, 102B into an SS7 ISUP Initial Address Message that is sent to a telephone central office switch or exchange. Such operations are controlled by Media Gateway Controller 112. Alternatively, such operations may be located in Media Gateway Controller 112.

Media Gateway Controller 112 is the overall controller of the system. It interworks with each Gatekeeper 102A, 102B, and can process H.225 and H.245 messages. It is also responsible for authentication and network security. It also monitors the resources of the overall system, and maintains control of all connections.

Each Gatekeeper 102A, 102B provides address translation and call control services to H.323 endpoints. It is also responsible for bandwidth control, a set of operations that allow endpoints to change their available bandwidth allocations on the LAN. A single Gatekeeper 102A, 102B manages one or more terminals, Gateways, and MCUs in a zone, which is a logical association of such components that may span multiple LANs.

Each Gatekeeper is also a controller and has some of the same responsibilities as the Media Gateway Controller 112, except that it does not control the Signaling Gateway 114 or Media Gateway 116. Its job is to control the H.323 activities on the IP-based network. Back End 104 may be used by Gateway 110 and its elements, and Gatekeepers 102A, 102B, to carry out support functions such as billing, database management, routing, and address resolution.

Reference interface E.a is the interface for telephony user links, such as lines and trunks. Reference interface E.b is the interface for SS7 signaling links.

Terminal 108 is an end-user device that is used to place or receive a call. Under H.323, a terminal is an end-user device that provides real-time, two-way voice, video, or data communications with another H.323 terminal. The terminal can also communicate with a Gateway 110 or a Multipoint Control Unit (MCU). The terminal does not need to be configured to support all services contemplated under H.323 and the specification does not require the terminal to be capable of multiple services.

ITU-T Recommendation H.235 of February, 1998 describes security and encryption for H-series multimedia terminals, including H.323 and other H.245-based terminals. Section 10.3.3 of H.235 specifies that data structures carrying encrypted information, called "cryptoTokens," can be used to allow endpoints to authenticate themselves to one another. However the token field of the cryptoEPPwdHash part of the cryptoH323Token and the cryptoGKPwdHash part is defined such that the authenticating endpoint is required to have access to the password associated with the endpoint that is being authenticated. The token field is calculated as follows:

token=[[[ . . . , timeStamp, generalID, password]*ASN*.1 encoded]*MD*5 Hash]

The "generalID" value is the to-be-authenticated endpoint's alias and the "password" is its associated password. The timestamp and the general ID are transmitted unencrypted ("in the clear"), along with the token. The authenticating endpoint uses the generalID value to look up its associated password, and performs the calculation set forth above to generate a token. If the received token matches the one generated locally, then the sender of the token has been successfully authenticated.

Given the many-to-one relationship between H.323 Gateways and H.323 Gatekeepers, a gatekeeper would have to maintain a large local database of gateway IDs and passwords, sufficient to authenticate all users of the system, or have some way to securely retrieve such gateway IDs and passwords in order to use cryptoTokens to authenticate gateways. The database potentially could require storage of Gateway identifiers, user account numbers, passwords, and PIN numbers. Since a Gatekeeper is responsible to interoperate with any number of Gateways within its zone, such a database potentially could be large. This is undesirable for numerous reasons; it requires a large amount of potential storage and represents a source of potential security leaks. Further, as the database size grows, the time required to authenticate a particular user increases. The problem is compounded if in addition it is desired for gateway users to be authenticated in the same way. Router or other embedded system based gatekeepers that don't have local database support are left with having to retrieve the needed information, possibly over insecure links.

Known network elements provide authentication mechanisms that may be useful in this context. For example, many networks rely on authentication servers with well-established authentication protocols in order to authenticate users before granting the users access to the network. An example of such authentication servers is a Remote Access Dial-In User (RADIUS) server that supports Challenge Handshake Authentication Protocol (CHAP). In conventional operation, a user logs in to a system, and the RADIUS server sends a random Challenge string. At a user endpoint, the Challenge string is used to calculate a Response or answer message. The RADIUS server determines whether the Response matches the Challenge based on a secure internal algorithm.

Based on the foregoing, there is a clear need for an improved way to authenticate endpoints under H.323.

In particular, for routers and embedded system gatekeepers, there is a need for a way to authenticate gateways and their users without the database management problem.

There is also a need for a way to carry out authentication among endpoints using existing technology, such as RADIUS servers, thereby moving the most significant processing burden involved in authentication to the RADIUS server.

SUMMARY OF THE INVENTION

The foregoing needs, and other needs and objects that will become apparent for the following description, are achieved in the present invention, which comprises, in one aspect, a method and apparatus for securely establishing voice over Internet Protocol calls. In one aspect, a Registration Security approach is provided, in which a Gateway sends an Access Token in all Registration Request messages. The Access Token contains information that authenticates the Gateway to the Gatekeeper. The Gatekeeper formats a message to an authentication server that will authenticate the information contained in the token, and the server responds with either an Access-Accept or Access-Reject message. The Gatekeeper responds to the Gateway with either a Registration Confirm message or a Registration Reject message. If a call is then placed from a successfully authenticated Gateway, that Gateway generates a new Access Token that is identical to the one generated during registration, except for the timestamp. The Gatekeeper uses the authentication server to authenticate the originating gateway, before sending the destination side Access Confirm message. As a result, a non-authenticated endpoint that knows a Gateway's address cannot use the Gateway address to circumvent security and access the telephone network to place unauthorized calls or free calls. In Admission or Per-Call Security, a Gateway is also required to include an Access Token in all originating side Admission Request messages. Such token contains information that identifies the user of the Gateway to the Gatekeeper, based on an account number and PIN obtained from the user. The Access Token is authenticated in the manner described above.

In another aspect, a method of securely establishing a call between a first node of a voice over Internet Protocol call connection and a second node thereof is provided. Non-encrypted authentication request information is received from the first node. From an authentication server that is communicatively coupled to the second node, an authentication message is received that indicates whether the first node is authenticated based on the non-encrypted authentication request information. A call is established between the second node and the first node only when the authentication message indicates that the first node is authenticated at the authentication server.

One feature of this aspect is that the step of receiving non-encrypted authentication request information comprises the steps of receiving an access token comprising a general identifier value, a time stamp value, a challenge value, and a random value. In a related feature, the step of receiving non-encrypted authentication request information comprises the steps of receiving an H.235 ClearToken comprising a general identifier value, a time stamp value, a challenge value, and a random value.

In another feature, the step of receiving non-encrypted authentication request information further comprises determining whether the authentication request information was created within a reasonable time with respect to the then-current time. A request for authentication is issued to the authentication server only when the authentication request information was created within a reasonable time with respect to the then-current time.

According to another feature, a password that is associated with the first node is received. An authentication response is generated, based on the password and challenge information contained in the authentication request information. The authentication response is tested to determine whether it matches the authentication request information. Authentication approval information is issued in the authentication message only when the authentication response matches the authentication request information. In a related feature, the response is generated using Challenge Handshake Authentication Protocol (CHAP) based on the password and implied CHAP challenge information contained in the authentication request information. Determining whether the authentication response matches the authentication request information is based on CHAP, and the authentication approval information is issued in the authentication message only when the authentication response matches the authentication request information based on CHAP.

In another aspect, the invention provides a method of securely establishing a call in a voice over Internet Protocol call connection system that includes a first gateway at a call origination point, a first gatekeeper, a second gatekeeper, a second gateway at a call termination point, and an authentication server that is communicatively coupled to the first gatekeeper and the second gatekeeper. Non-encrypted authentication request information is received from the first gateway. An authentication message is received indicating whether the first gateway is authenticated based on the non-encrypted authentication request information. A call is established between the second gateway and the first gateway only when the authentication message indicates that the first gateway is authenticated at the authentication server.

In yet another aspect, the invention provides a method that includes receiving user identification information from the first gateway that comprises a user identifier and a personal identification number that are uniquely associated with a calling party who originates a call using the first gateway. From the authentication server, a first authentication message is received, which indicates whether the user identification information is authenticated. Non-encrypted authentication request information is received from the first gateway. From the authentication server, a second authentication message is received, indicating whether the first gateway is authenticated based on the non-encrypted authentication request information. A call is established between the second gateway and the first gateway for the calling party only when the first authentication message indicates that the user identification information is authenticated and the second authentication message indicates that the first gateway is authenticated at the authentication server.

In other aspects, the invention encompasses a computer apparatus, a computer readable medium, and a carrier wave configured to carry out the foregoing steps. Still other aspects and features will become apparent from the appended description and claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for authenticating endpoints of a voice over Internet Protocol call connection is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Overview; Access Tokens

In one embodiment, a subscription-based, password with hashing approach is provided for authentication of H.235 endpoint nodes. Rather than using H.225 CryptoTokens, the approach of this disclosure uses data structures that carry unencrypted data (e.g., H.235 ClearTokens) that have fields populated for use with authentication servers such as RADIUS servers. As a result, an authenticating Gatekeeper need not maintain or acquire passwords for users and gateways using a database or other means.

Figure 1:
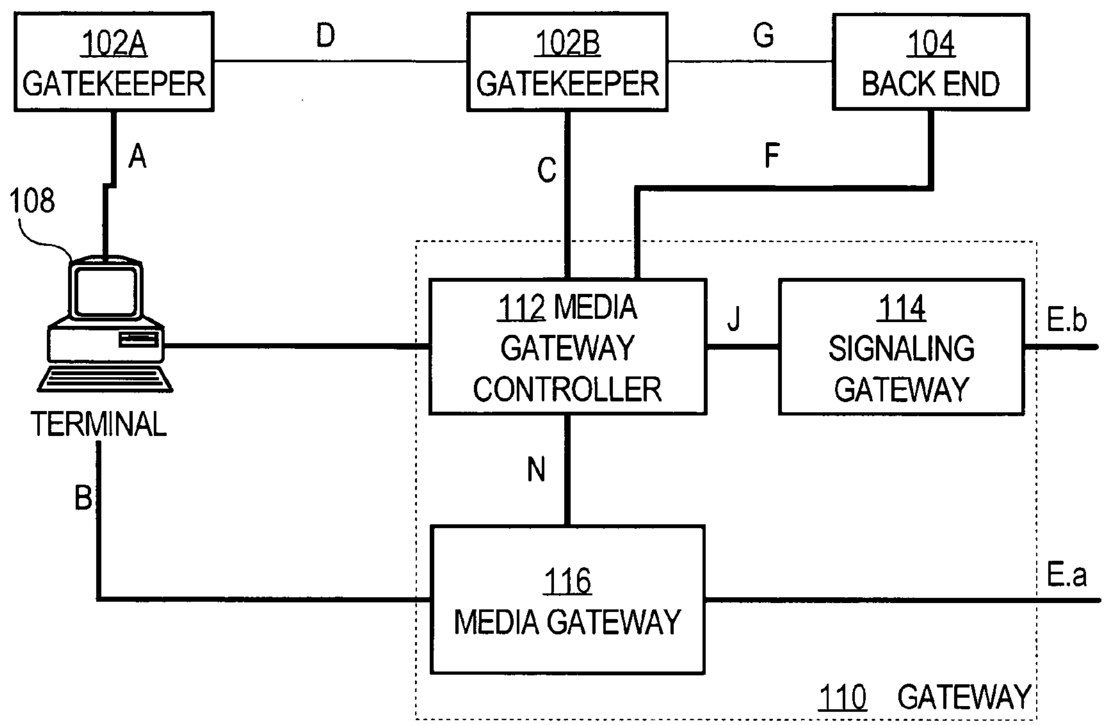
FIG. 1 is a block diagram that illustrates a model of various VoIP functions in VoIP physical entities.
Figure 2A:
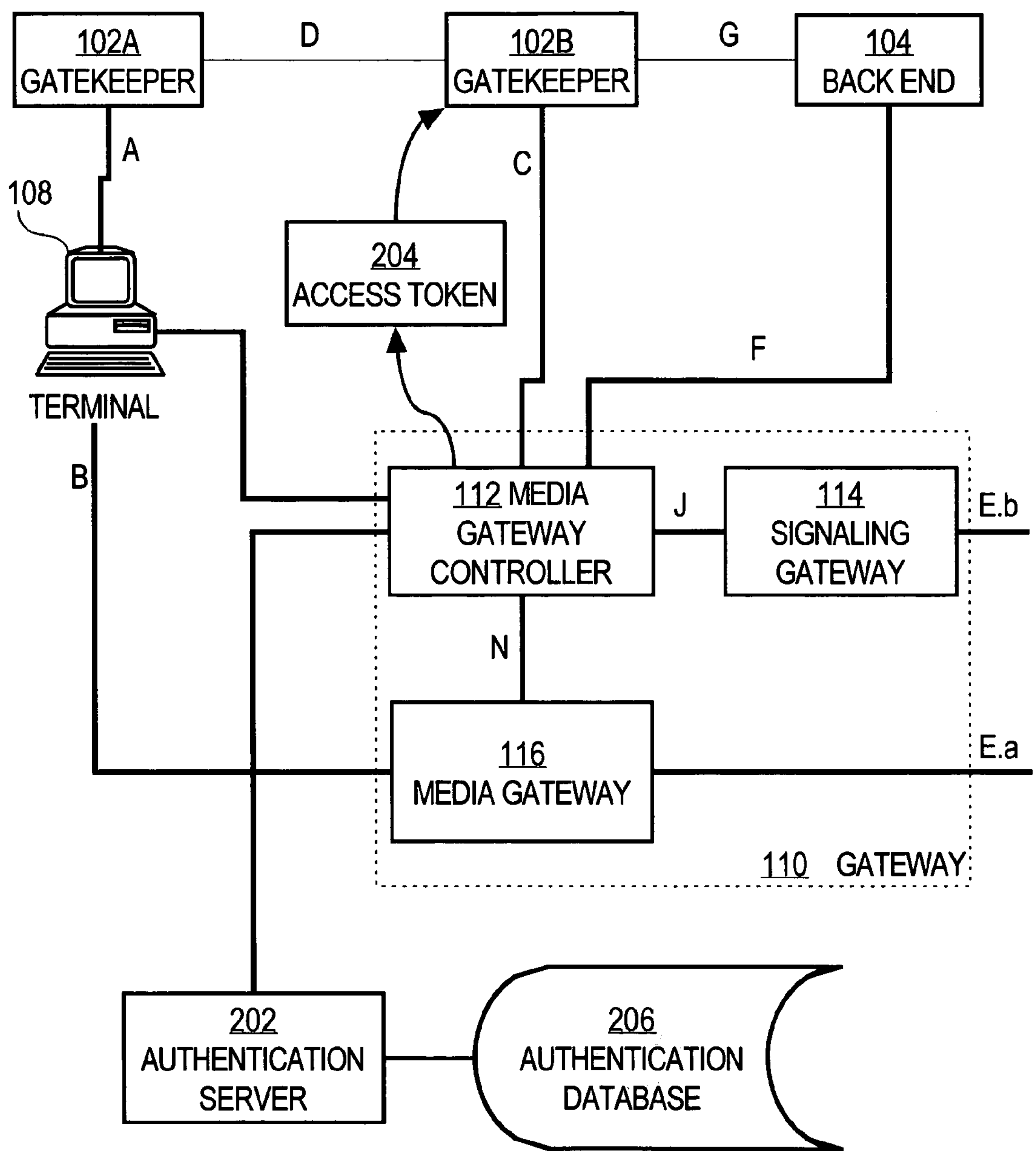
FIG. 2A is a block diagram of a system that may be used according to one approach.

FIG. 2A is a block diagram of a system that may be used according to one approach, in which like elements with respect to FIG. 1 have like numbered reference numerals.

An Authentication Server 202 is communicatively coupled to Gateway 110, for example, at Media Gateway Controller 112. Authentication Server 202 provides authentication, authorization, and/or access services, such as password authentication, etc. In one embodiment, Authentication Server 202 is a RADIUS server.

Gatekeepers 102A, 102B communicate with Media Gateway Controller 112 using one or more Access Tokens 204.

While both CHAP and H.235 use MD5 hashing to provide security, according to an embodiment, a mapping between the CHAP and H.235 messages allows CHAP to use H.235 token data for authentication. In this embodiment, the cryptoToken fields are mapped to fields of Access Token 204, which acts as an H.235 ClearToken for transport purposes. In this configuration, Access Token 204 carries all information needed to carry out a CHAP protocol Challenge and to enable a node that receives such a Challenge to create and evaluate a response.

Figure 2B:
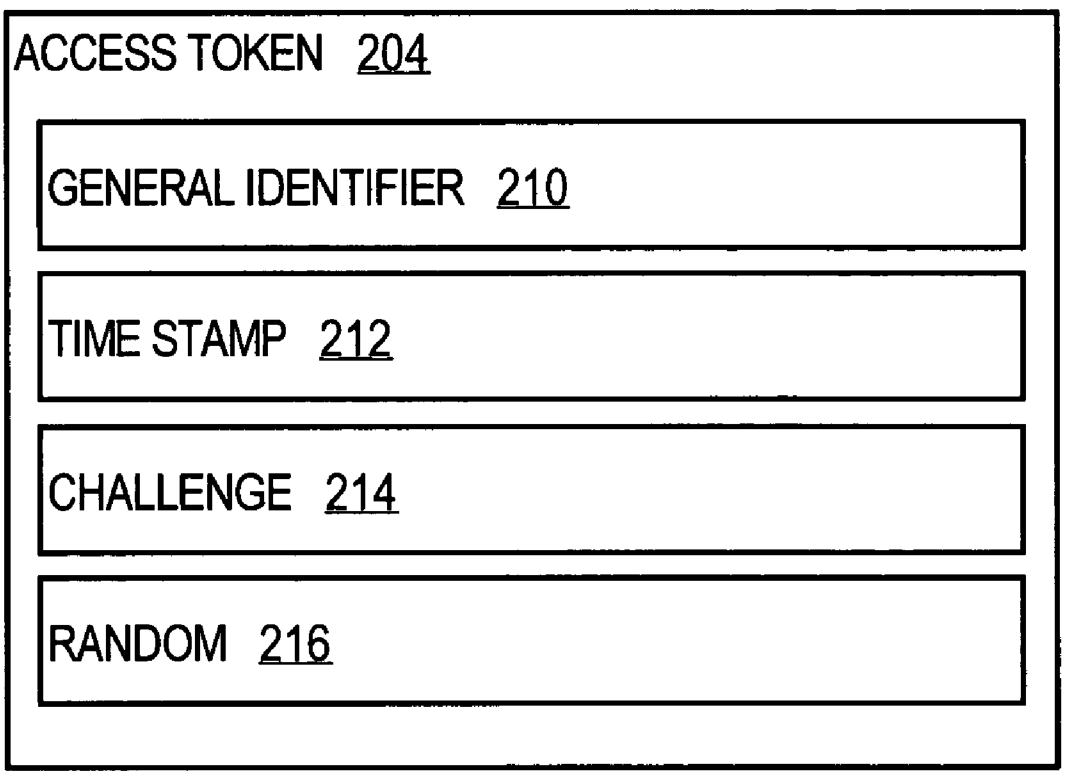
FIG. 2B is a block diagram of one specific embodiment of an Access Token.

FIG. 2B is a block diagram of one specific embodiment of an Access Token. In this embodiment, Access Token 204 comprises a ClearToken as specified in the H.235 recommendation, with certain additional optional specified values. The Access Token 204 carries authentication information for an endpoint or user in a way that permits a Gatekeeper to pass values from the Access Token to a RADIUS authentication server in a RADIUS Access Request message.

In one specific embodiment, each Access Token 204 comprises a General Identifier value 210, Time Stamp value 212, Challenge value 214, and Random value 216. Each value may comprise stored in any format, e.g., integer, string, binary, etc. The contents and function of each value, and the RADIUS attributes to which a Gatekeeper may map the values, are set forth in Table 1.

An appropriate interface is provided to enable a Gatekeeper to connect to an H.323 AAA subsystem to perform a CHAP authentication. In one specific embodiment, each Gatekeeper has a GK process and a GK AAA process. An interface call is provided to pass a request to do a CHAP authentication from the GK process to the GK AAA process. The interface call may have the following structure:

```
userstruct *
voip_chapstyle_auth (
     char *name,          /* alias or user to be authenticated */
uchar *challenge,         /* the CHAP Challenge */
int *challenge_size,      /* length of the CHAP challenge in bytes */
uchar *response,          /* the CHAP Response to the CHAP Challenge */
uchar *challenge_id);     /* the CHAP ID */
```

In one specific embodiment, authentication processing by the GK process and GK AAA process initiates when a Gateway directs a Request message (either an Admission Request or Registration Request) to a Gatekeeper, which message is directed to the GK process. The GK process directs an IPC message containing the general identifier value, time stamp value, random value, and Challenge value to the GK AAA process. The GK AAA process formats an Access Request message and forwards it to a RADIUS server. The RADIUS server determines whether the user is authenticated and returns either an Access Accept or an Access Reject message to the GK AAA process.

Based on the received message, the GK AAA process sends a return code value to the GK process. For example, the GK AAA process may return one of the following return code values: SUCCESS (when a user is authenticated); REJECT (when a user is not allowed access; USER_UNKNOWN (when a user does not have a valid server record); SERVER_ERROR (when the Authentication Server or RADIUS server is down or unreachable). When the return code is SUCCESS, the GK process sends either an Admission Confirm or Registration Confirm message to the Gateway, depending on the type of Request it originally received. When the return code from the GK AAA process is REJECT, the GK process sends either an Admission Reject message or Registration Reject message to the Gateway.

TABLE 1

ACCESS TOKEN VALUES

///
///
///

| ACCESS TOKEN VALUE | RADIUS ATTRIBUTE (#) | DESCRIPTION |
|---|---|---|
| General Identifier | User-Name (1) | The Gateway H.323-ID value or a user account number |
| Time Stamp | CHAP-Challenge (60) | The current time of the Gateway; used as an implied CHAP-challenge as if it initially came from the Gatekeeper. |
| Challenge | CHAP-Password: Chap Response (3) | A 16-byte MD5 message digest that is generated by the Gateway. |
| Random | CHAP-Password: CHAP Identifier (3) | A one-byte value that is used by an authentication server to identify a particular request. The Gateway increments a variable modulo 256 for each authentication request to provide the value. |
| tokenOID (object identifier) | Not used | Identifies all tokens of this type. |

///
///
///

A Gateway may generate the MD5 message digest using the following values where "+" denotes concatenation:

Challenge=[Random value+Gateway User Password+Time Stamp value]*MD*5 Hash

An authentication server that uses CHAP performs the following calculation to determine what the challenge should be:

*CHAP* Response=[*CHAP ID*+User Password+*CHAP* Challenge]*MD*5 Hash

As described further below, the Time Stamp value is used as an implied CHAP Challenge, and the Random value carries a CHAP ID value rather than a random number. The CHAP ID value is a counter on the Gateway that is incremented with each message sent to the Gatekeeper, modulo 256.

Levels of Authentication

In one embodiment, using messages carrying the foregoing values, two levels of authentication are provided, designated as Registration Level Security and Admission or Per-Call Level Security.

With a Gatekeeper that uses Registration Security, the Gateway includes an Access Token in all Registration Request (RRQ) messages. In such a case, the Access Token contains information that authenticates the Gateway to the Gatekeeper. The Gatekeeper formats a message to a RADIUS server that will authenticate the information contained in the token. It will respond back to the Gatekeeper with either an Access-Accept or Access-Reject message. In turn, the Gatekeeper responds to the Gateway with either a Registration Confirm (RCF) message or a Registration Reject (RRJ) message.

If a call is then placed from a successfully authenticated Gateway, that Gateway generates a new Access token upon receipt of an Access Confirm (ACF) message from the Gatekeeper. This token is identical to the one generated during registration, except for the timestamp. It is placed in the outgoing SETUP message from which the destination gateway extracts it and places it in the destination side Access Request (ARQ) message. The Gatekeeper uses RADIUS, as before, to authenticate the originating gateway, before sending the designation side Access Confirm message.

As a result, a non-authenticated endpoint that knows a Gateway's address cannot use the Gateway address to circumvent the security scheme and access the public telephone network, and place unauthorized calls or free calls.

Admission or Per-Call security builds upon Registration Level Security. In addition to meeting Registration Level Security requirements, a Gateway is also required to include an Access Token in all originating side ARQ messages when Per-Call security is enabled on the gatekeeper. The token in this case contains information that identifies the user of the Gateway to the Gatekeeper. This information is obtained using an Interactive Voice Response (IVR) script on the Gateway that prompts the user to enter his User ID and PIN number from the terminal or telephone keypad before placing a call. The Access Token contained in the originating ARQ is authenticated by RADIUS in the manner described above.

Registration Call Flow

Based on this mapping, in one specific embodiment, authentication proceeds according to the one or more sequences or flows of messages.

Figure 3A:
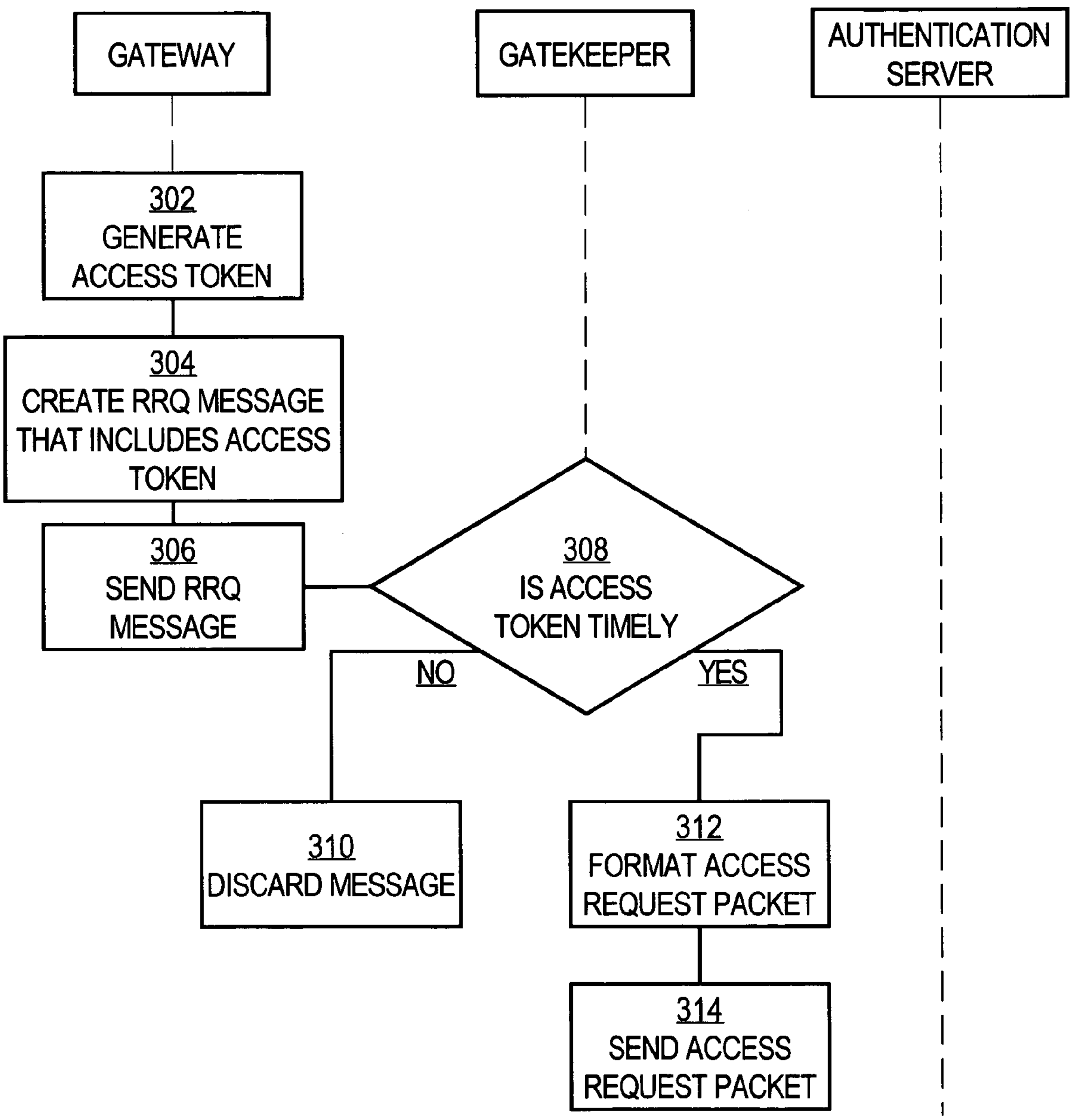
FIG. 3A is a diagram of messages that may pass between elements of the system of FIG. 2A in a secure Registration message flow.

FIG. 3A is a diagram of messages that may pass between elements of the system of FIG. 2A in a secure Registration message flow. Such a message flow can be used for all exchanges between gateways and gatekeepers.

In block 302, a Gateway generates an Access Token using its Gateway password and the Gateway alias, which is a unique identifier of the Gateway under H.323. In block 304, the Gateway creates a Registration Request (RRQ) message to send to the Gatekeeper that includes the Access Token. In block 306, the RRQ message is sent to the Gatekeeper.

In block 308, the Gatekeeper determines whether the Access Token is timely. In one specific embodiment, the Gatekeeper checks the Time Stamp value of the Access Token, to determine whether the Access Token was created within an acceptable interval with respect to the current time. In one embodiment, an acceptable interval is about 30 seconds. A token created earlier than the specified interval before the current time causes the Gatekeeper to discard the message, as indicated by block 310. As a result, replay attacks are thwarted. A replay attack could occur if a process "snooped" and stored one or more tokens, and then attempted to reuse one or more of the snooped tokens. In a specific embodiment, all Gateways and Gatekeepers use Network Time Protocol to synchronize their clocks, thereby avoiding problems arising from time skew and ensuring coordination.

If the Access Token is timely, e.g., has a Time Stamp value, then in block 312, the Gatekeeper creates and formats an Access Request packet. In one specific embodiment, formatting an Access Request packet may involve creating a RADIUS Access Request that includes appropriate attribute values that can verify a CHAP Challenge. In block 314, the Access Request packet is sent to an authentication server.

Figure 3B:
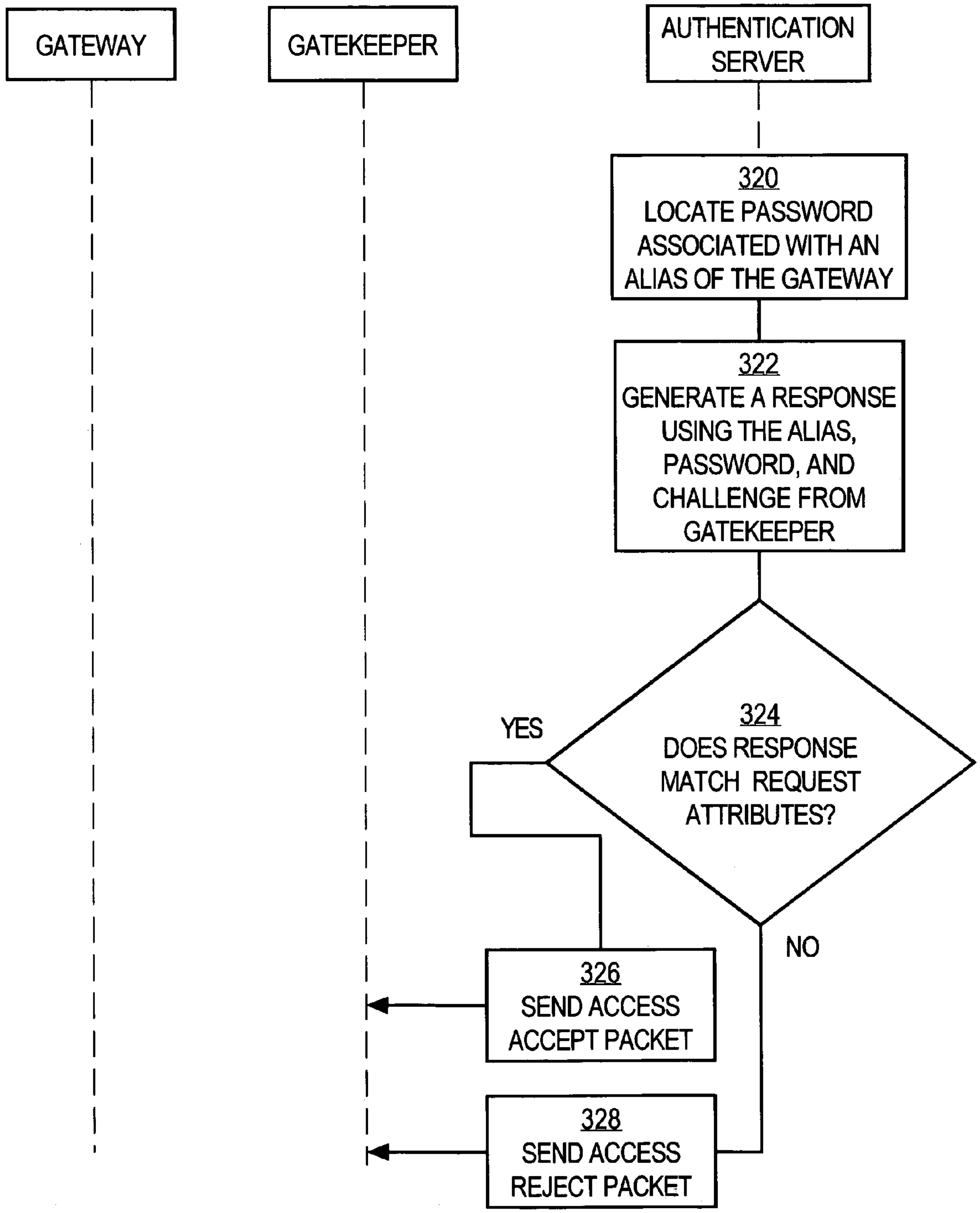
FIG. 3B is a diagram of messages that may pass between elements of the system of FIG. 2A in a secure Registration message flow.

Referring now to FIG. 3B, assuming that the Gateway's alias is known at the authentication server, the authentication server locates in its storage a password that is associated with the alias of the Gateway, as shown by block 320. In block 322, the authentication server creates and stores generates a CHAP protocol response using the alias, password, and the CHAP Challenge values that the authentication server has received from the Gatekeeper in the Access Request packet. In one specific embodiment, the response is computed as:

Response=[*CHAP ID*+User Password+*CHAP* Challenge]*MD*5 Hash

In block 324, the authentication server determines whether the response it has generated matches attributes of the Access Token. In one specific embodiment, such determination is carried out by determining whether the Response matches a Challenge that is computed from the Access Request message attributes as follows:

Challenge=[Random value+Gateway User Password+Time Stamp value]*MD*5 Hash

If the computed Response matches the computed Challenge, based on the values received from the Gatekeeper, then the Authentication Server sends an Access Accept packet to the Gatekeeper, as shown in block 326. If the computed Response does not match the computed Challenge, or the alias of the requesting Gateway is not in a database of the authentication server, the server sends an Access Reject packet back to the Gatekeeper, as shown by block 328.

Figure 3C:
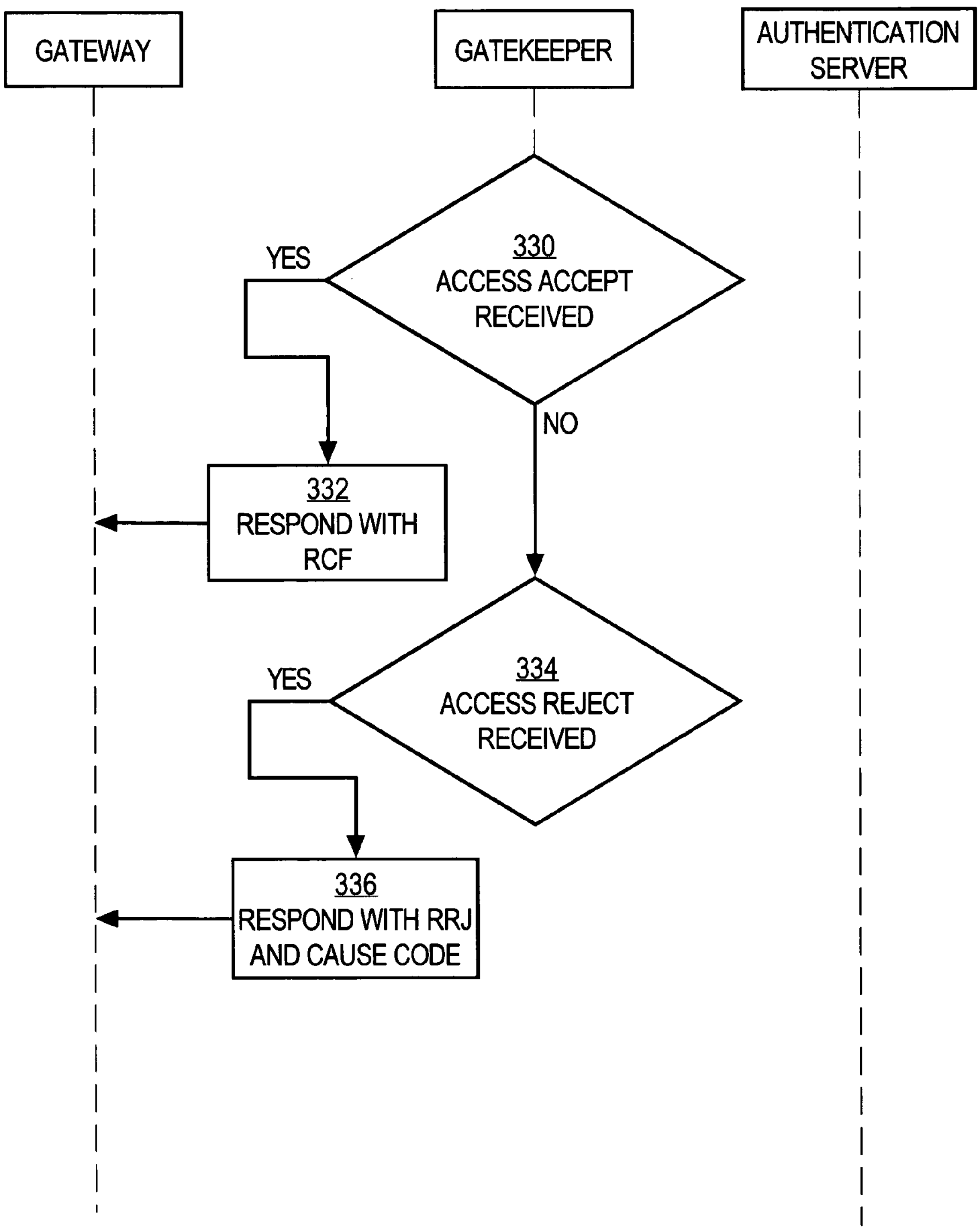
FIG. 3C is a diagram of messages that may pass between elements of the system of FIG. 2A in a secure Registration message flow.

Referring now to FIG. 3C, in block 330, the requesting Gatekeeper determines whether it has received an Access Accept message or an Access Reject message, as tested in block 330 and block 334, respectively. If an Access Accept message was received, then the Gatekeeper responds to the Gateway with a Registration Confirm (RCF) message, as shown by block 332. If an Access Reject message is received, then the Gatekeeper responds to the Gateway with a Registration Reject (RRJ) message with a code that indicates a security problem occurred, as shown by block 336. For example, the cause code securityDenial may be used if the Gatekeeper received an Access Reject.

Call Flow with Registration Security

FIG. 4A, FIG. 4B, FIG. 4C, FIG. 4D, FIG. 4E, FIG. 4F, FIG. 4G are block diagrams of a process of connecting a VoIP call between a first Gateway and a second Gateway using Registration Security. The message flow depicted in such diagrams involves messages communicated among a first Gateway, a first Gatekeeper, an Authentication Server, a second Gatekeeper, and a second Gateway. As an example, such diagrams relate to a call originating in the PSTN inbound to the first Gateway and having a destination associated with the second Gateway.

A call originates in the PSTN when a caller takes a telephone handset off-hook and dials a valid number. Switching equipment in the PSTN directs the call to the first Gateway, in part by sending a SETUP message to the first Gateway (the originating Gateway), as shown by block 402. Upon receiving the SETUP message from the PSTN, the originating Gateway sends an Admission Request (ARQ) message 404 to the first Gatekeeper and receives an Admission Confirm (ACF) message 406 from the Gatekeeper.

When the first Gateway receives the ACF message, the first Gateway determines whether the ACF message already contains an access token of some kind, as indicated by block 408. The presence of another kind of access token is taken to indicate that the security protocol described herein is not in use, and in response to detection of such an access token, the message flow of FIG. 4A terminates or returns. If there is no access token currently present in the ACF message, the first Gateway generates an Access Token based on a password of that Gateway, an alias of that Gateway (e.g., its H.323 identifier), and the current time. The generated Access Token is stored in a Call Control Block (CCB) data structure that is managed by the first Gateway. The first Gateway then retrieves the Access Token from the CCB and places it in a clearToken within the SETUP message, as shown in block 410. In block 412, the first Gateway sends the SETUP message to the second (terminating) Gateway.

Figure 4A:
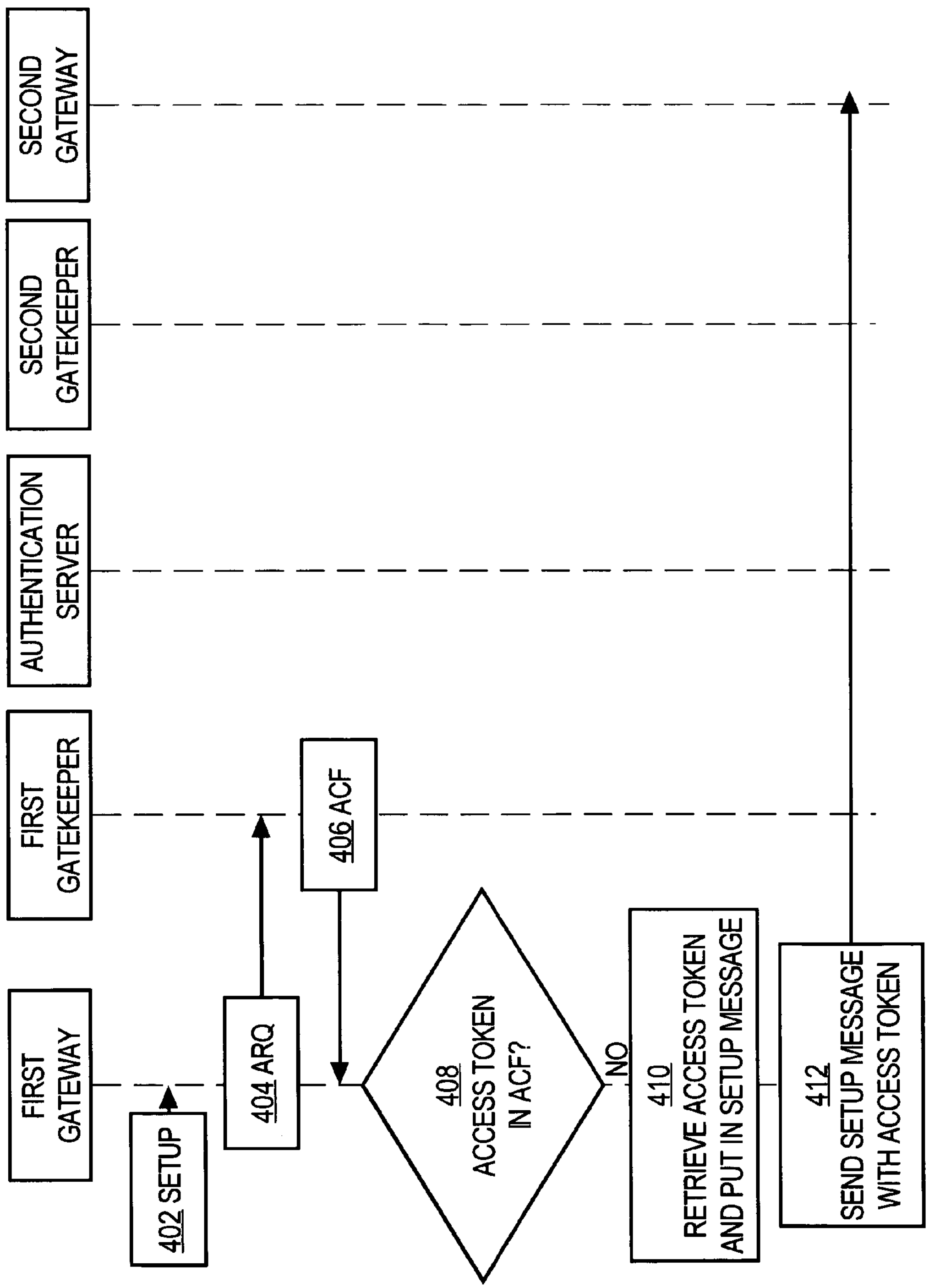
FIG. 4A is a block diagram of a part of a process of connecting a VoIP call between a first Gateway and a second Gateway using Registration Security.
Figure 4B:
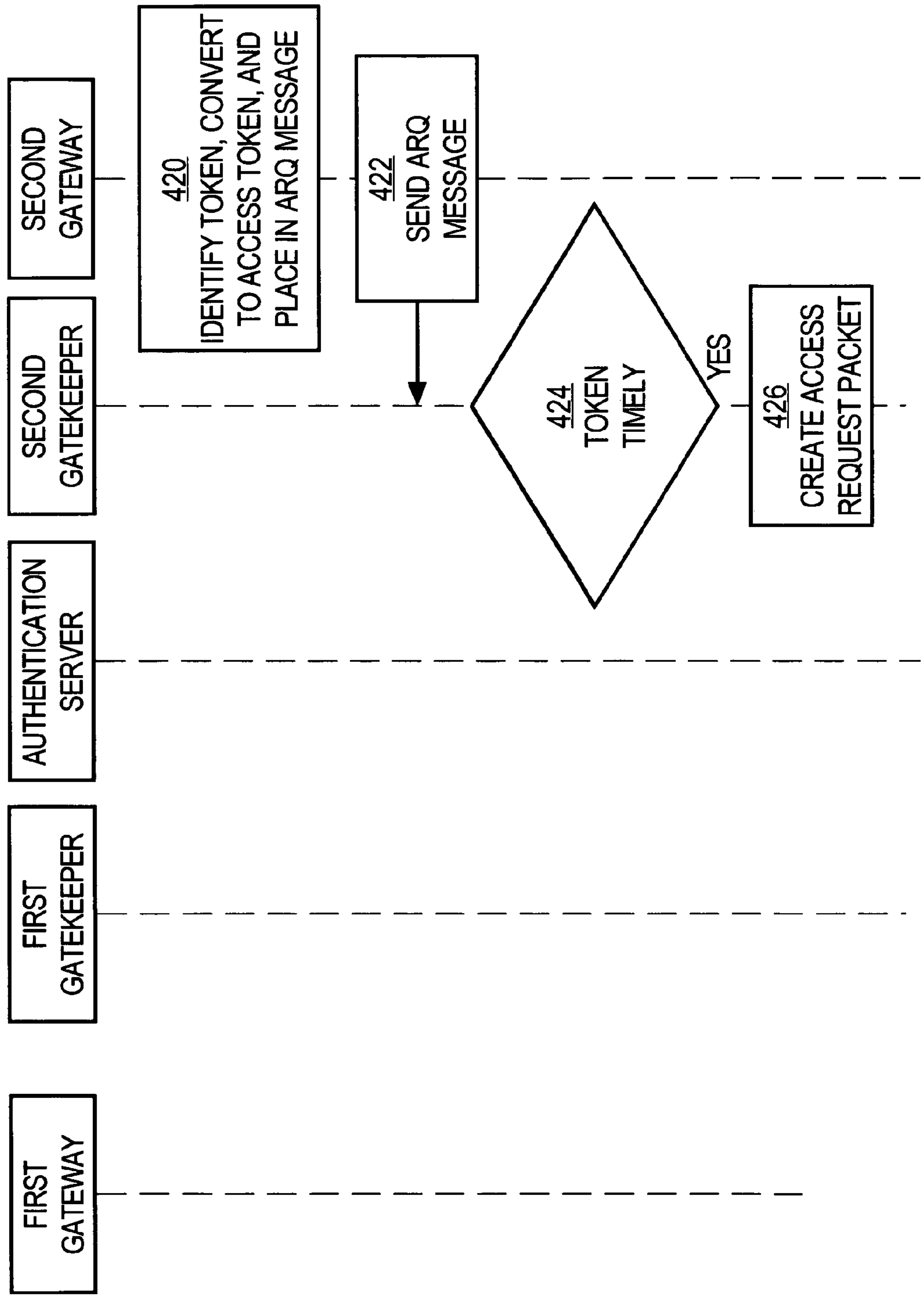
FIG. 4B is a block diagram of a part of a process of connecting a VoIP call between a first Gateway and a second Gateway using Registration Security.
Figure 4C:
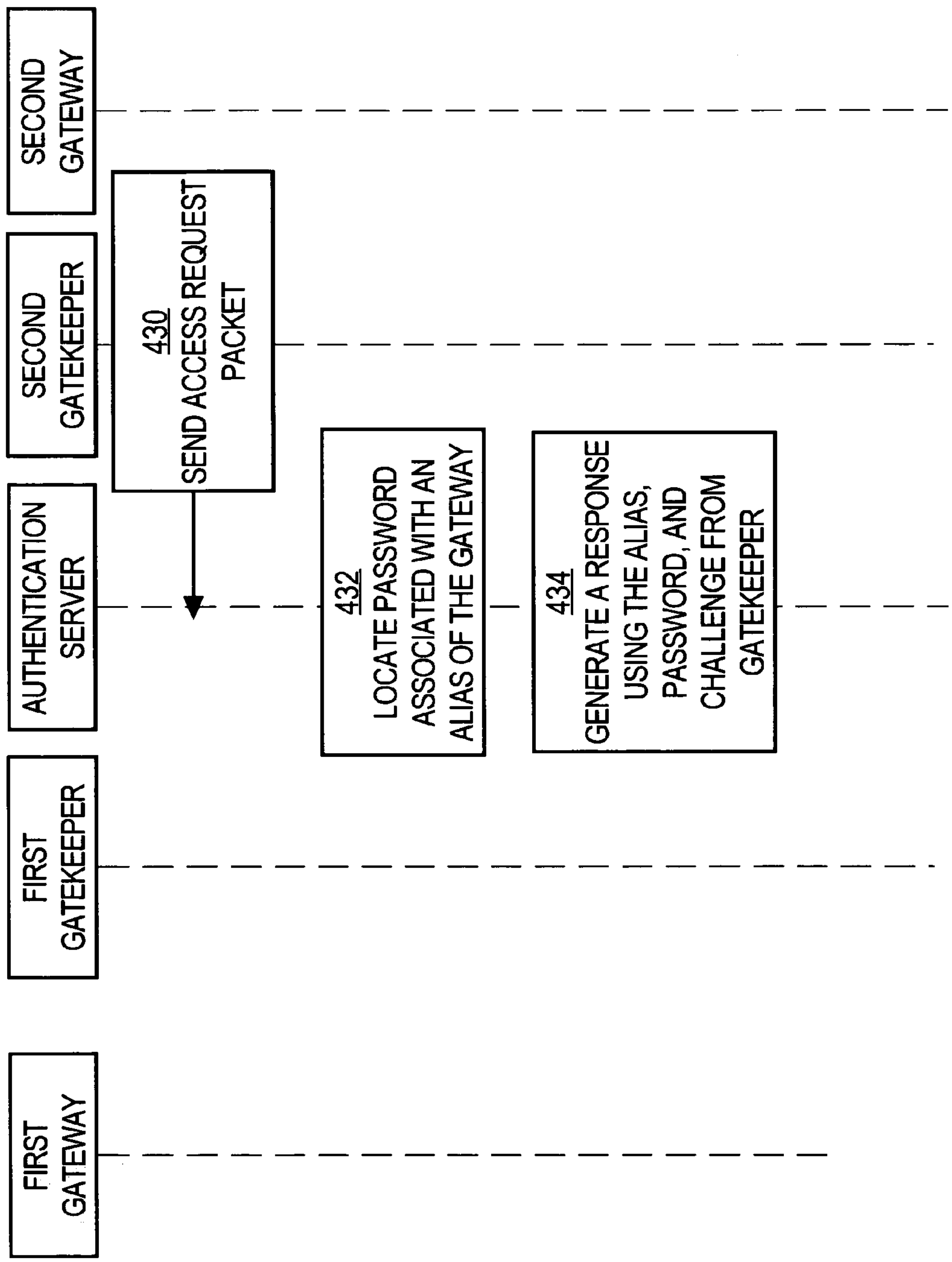
FIG. 4C is a block diagram of a part of a process of connecting a VoIP call between a first Gateway and a second Gateway using Registration Security.

Referring now to FIG. 4B, block 420, upon receiving the SETUP message, the terminating Gateway identifies and removes the clearToken (Access Token) from the SETUP message and places it in an ARQ message. In block 422, the terminating Gateway sends the ARQ message to the second (terminating) Gatekeeper.

In block 424, the second Gatekeeper determines whether the Access Token has been received in a timely manner. For example, the second Gatekeeper checks the timestamp value of the token to determine whether it is within an acceptable interval of time relative to the current time at the second Gatekeeper. For example, an acceptable time interval is 30 seconds before the current time of the second Gatekeeper. A token having a time stamp value outside such range causes the second Gatekeeper to discard the message, thereby causing the call to be rejected.

If the token is acceptable, the second Gatekeeper sends an access request message directed to the authentication server, as shown by block 426. In one embodiment, block 426 involves creating and formatting a RADIUS Access Request packet using values of attributes that are appropriate to verify a CHAP Challenge. The second gatekeeper then sends the access request message to an authentication server, as shown by block 430 of FIG. 4C.

Figure 4D:
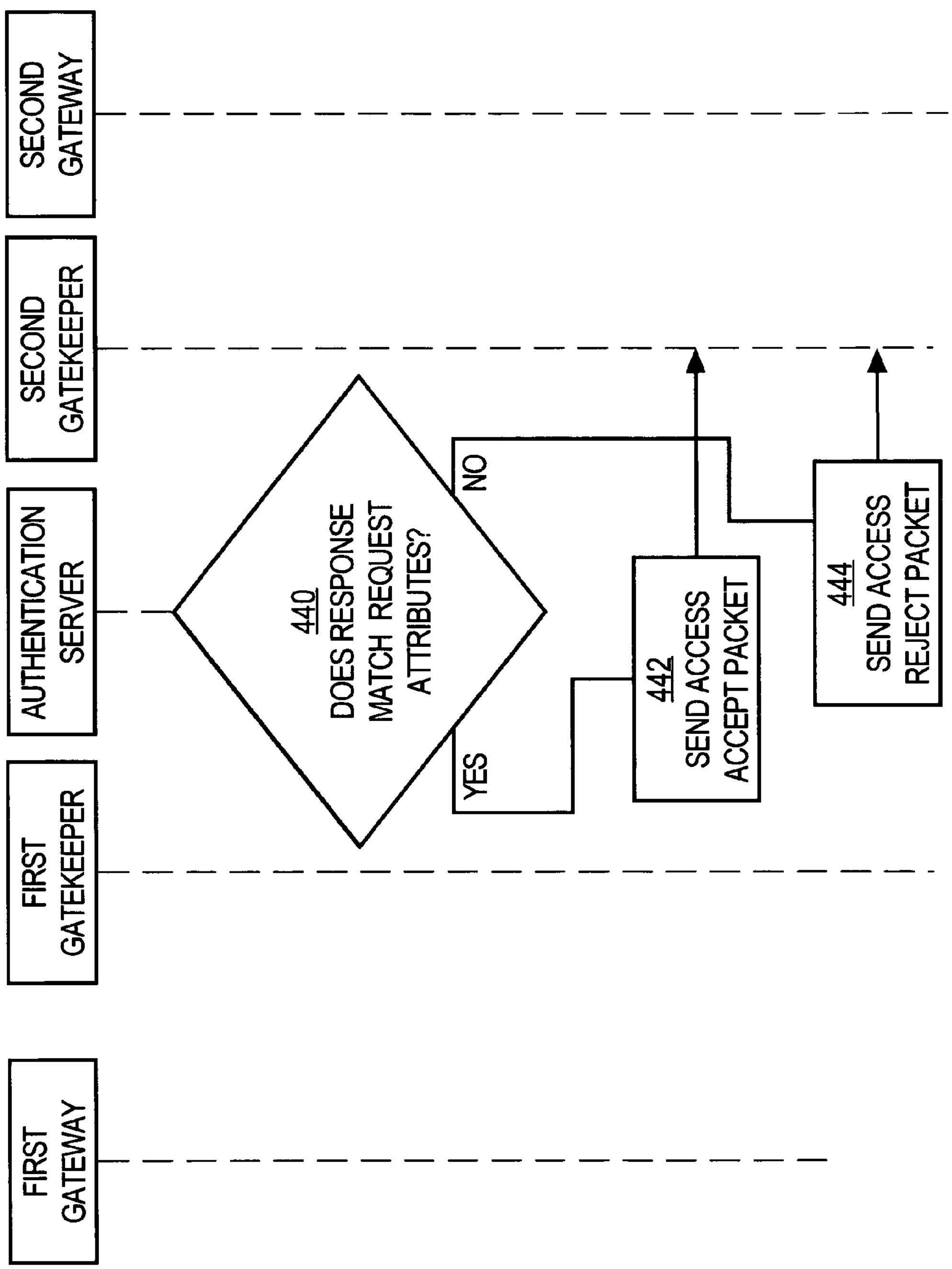
FIG. 4D is a block diagram of a part of a process of connecting a VoIP call between a first Gateway and a second Gateway using Registration Security.

Referring again to FIG. 4C, in block 432, assuming that the alias of the first Gateway is known at the authentication server, the authentication server locates a password that is associated with such alias. The authentication server then generates a CHAP Response based on the alias and password of the first Gateway, and the CHAP Challenge value that the authentication server has received from the Gatekeeper, as shown by block 434. Referring now to FIG. 4D, if the CHAP Response matches the CHAP Challenge that is received from the second Gatekeeper in the Access Token, as tested in block 440, the authentication server sends an Access Accept packet to the Gatekeeper, as shown by block 442. If there is no match, or if the alias of the first Gateway is not in the server's database, the server sends an Access Reject packet back to the second Gatekeeper, as shown by block 444.

Figure 4E:
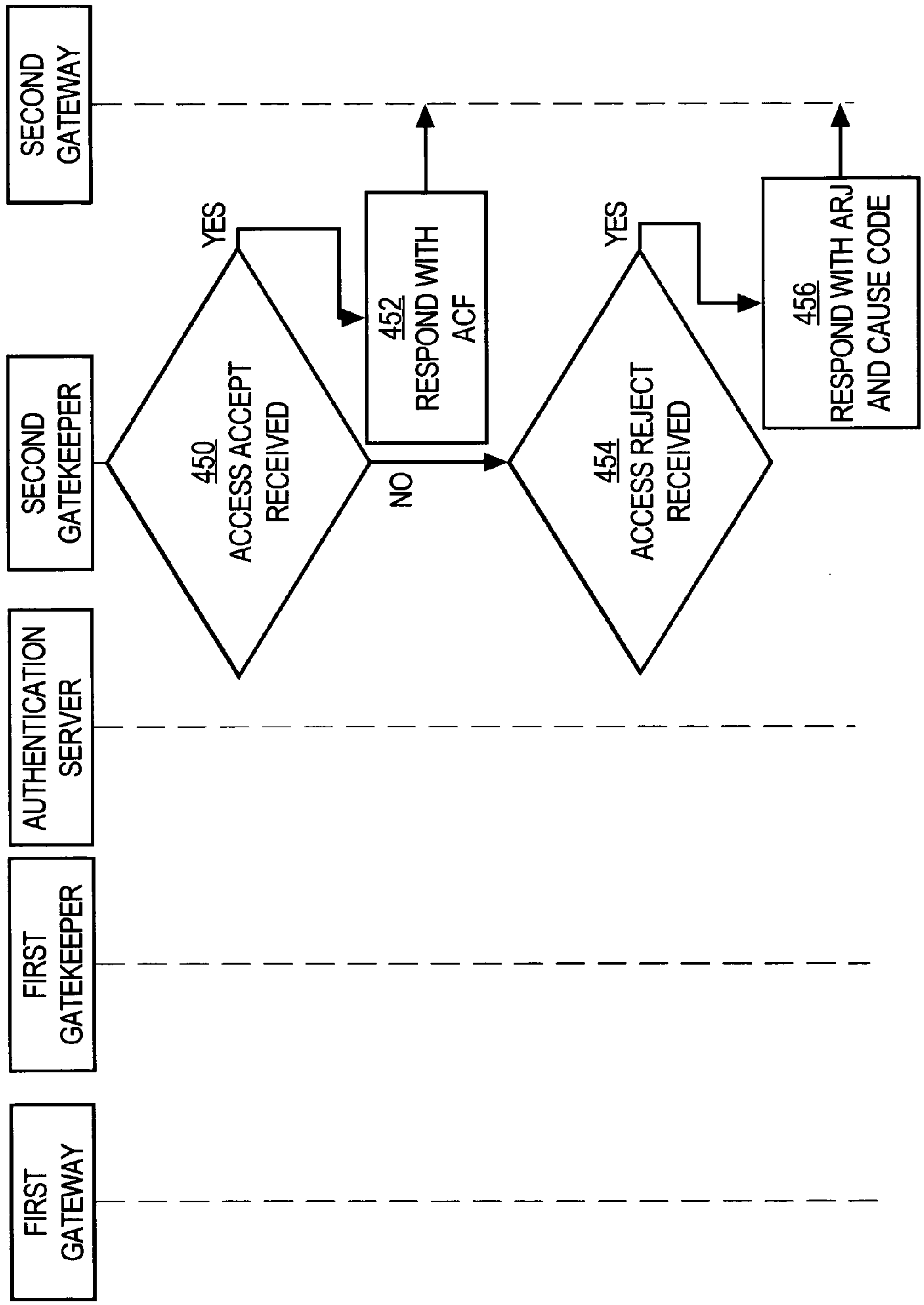
FIG. 4E is a block diagram of a part of a process of connecting a VoIP call between a first Gateway and a second Gateway using Registration Security.

Referring now to FIG. 4E, the second Gatekeeper determines whether it has received an Access Accept message, as shown by block 450, or an Access Reject message, as shown by block 454. If an Access Accept message is received, then the second Gatekeeper responds to the second Gateway with an ACF message, as shown by block 452. If it received an Access Reject message, then in block 456 the second Gatekeeper responds to the second Gateway with an Admission Reject (ARJ) message, and a cause code that indicates that a security denial occurred.

Figure 4F:
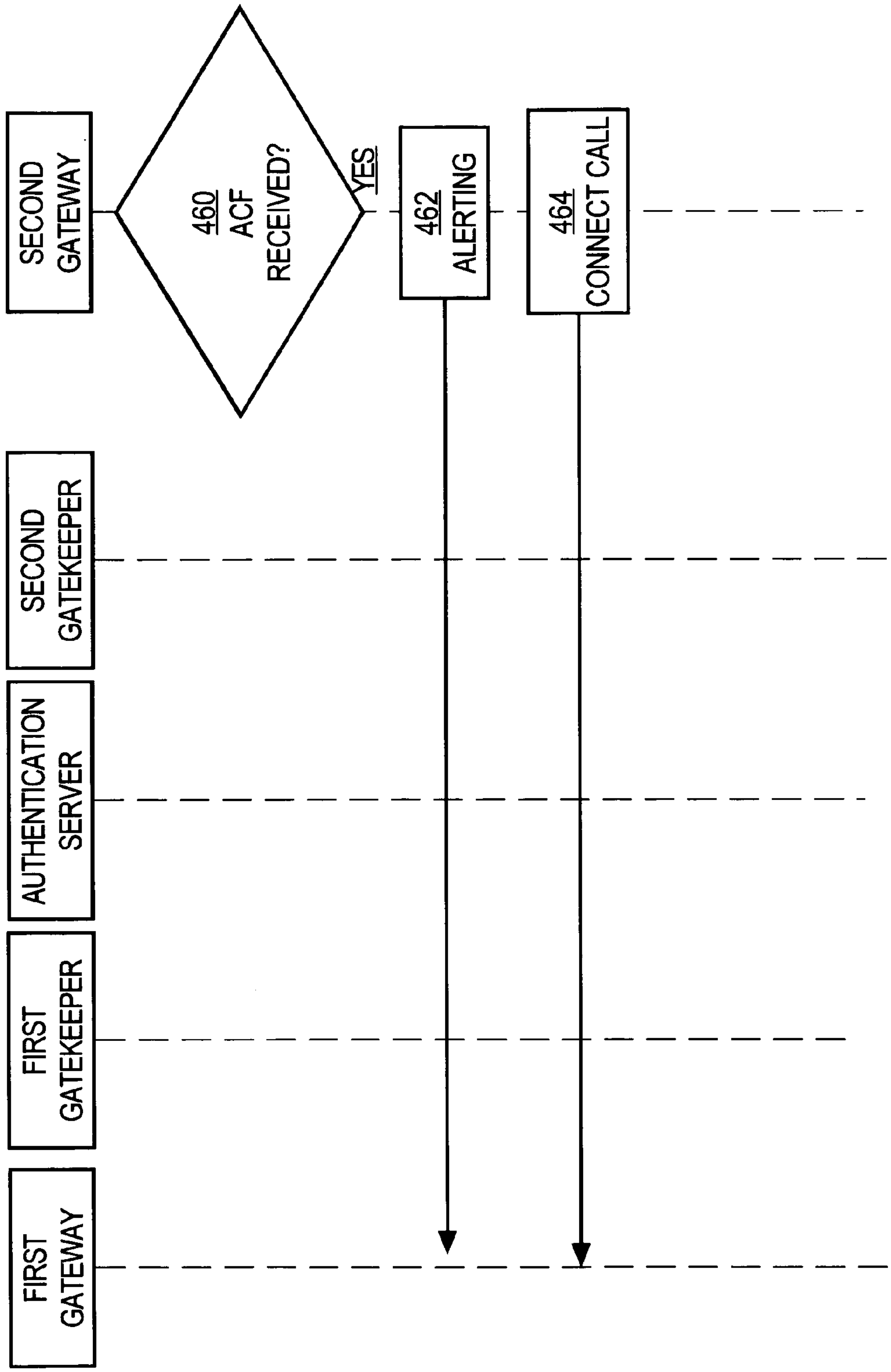
FIG. 4F is a block diagram of a part of a process of connecting a VoIP call between a first Gateway and a second Gateway using Registration Security.

Referring now to FIG. 4F, in block 460, the second Gateway determines whether it has received an ACF message. If so, then the call is connected. In one embodiment, connecting a call involves sending an Alerting message 462 and a Connect Call message 464 from the second Gateway to the first Gateway.

Call Flow with Admission Security

FIG. 5A, FIG. 5B, FIG. 5C, FIG. 5D, FIG. 5E, FIG. 5F, FIG. 5G, FIG. 5H, FIG. 5J, FIG. 5K are block diagrams of a process of connecting a VoIP call between a first Gateway and a second Gateway using Admission Security. The message flow depicted in such diagrams involves messages communicated among a first Gateway, a first Gatekeeper, an Authentication Server, a second Gatekeeper, and a second Gateway. As an example, such diagrams relate to a call originating in the PSTN inbound to the first Gateway and having a destination associated with the second Gateway.

Figure 5A:
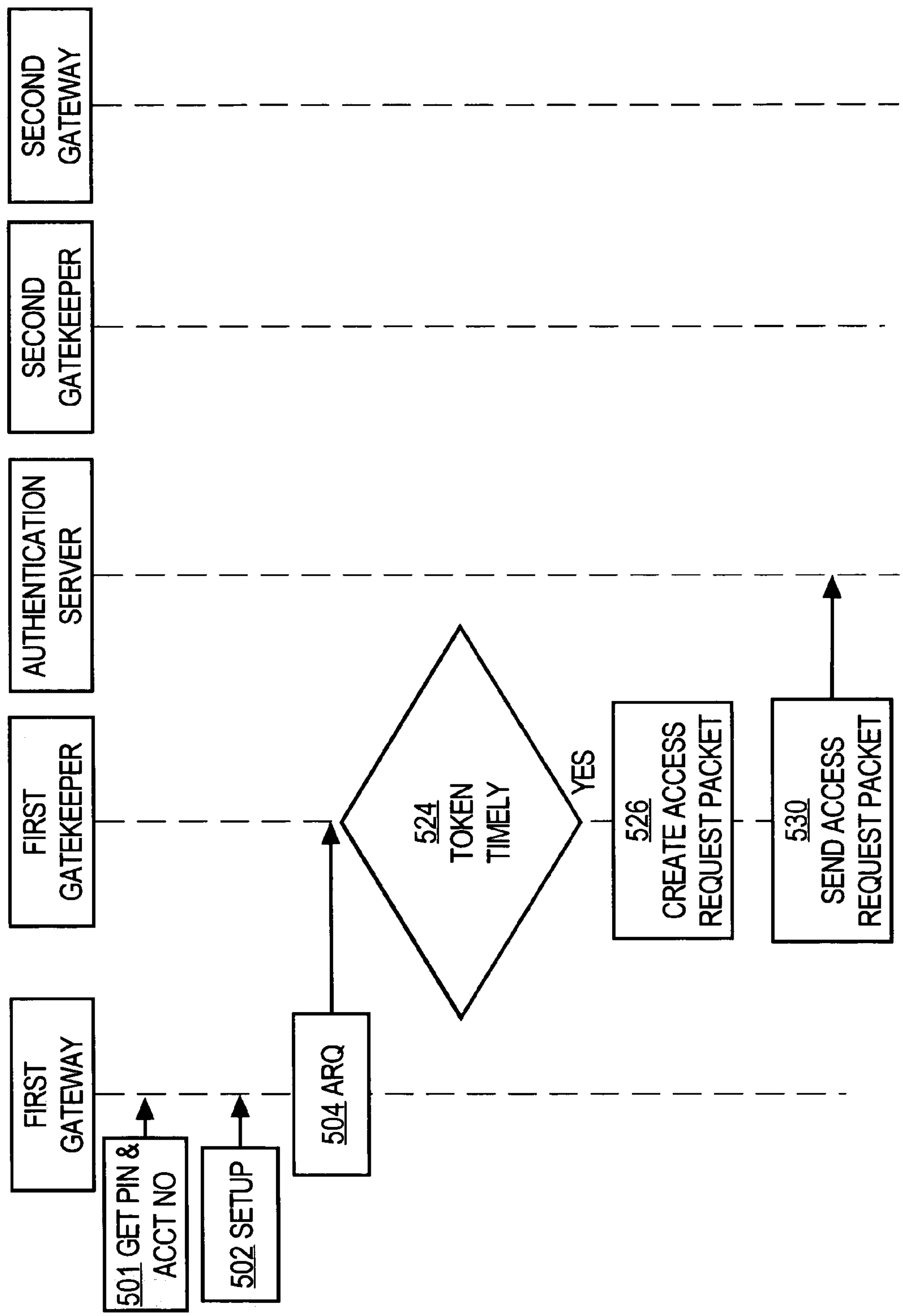
FIG. 5A is a block diagram of a part of a process of connecting a VoIP call between a first Gateway and a second Gateway using Admission Security.

Referring now to FIG. 5A, to originate a call, a user first accesses the Gateway by telephone. As shown by block 501, the Gateway receives an Account Number and personal identification number (PIN) from the user. For example, an Interactive Voice Response (IVR) script executes and audibly prompts the user to enter the Account Number and PIN using keys of the phone. When the numbers are received, they are stored in the CCB.

At a point in time after such numbers are received and stored in the CCB, either immediately thereafter or some time later, a call originates when a the user (caller) places a call to a called party through a telephone, IP phone, or software phone and dials a valid number. Software or hardware components of the phone direct the call to the first Gateway, e.g., in a SETUP message, as indicated by block 502.

The Gateway retrieves the Account Number and PIN, and the current time value from its clock. The Gateway then generates an Access Token based on the Account Number value, PIN, and current time value. The token identifies the user and is sent to the first Gatekeeper in an ARQ message, as shown by block 504.

In block 524, the first Gatekeeper determines whether the Access Token has been received in a timely manner. For example, the first Gatekeeper checks the timestamp value of the token to determine whether it is within an acceptable interval of time relative to the current time at the first Gatekeeper. For example, an acceptable time interval is 30 seconds before the current time of the first Gatekeeper. A token having a time stamp value outside such range causes the first Gatekeeper to discard the message, thereby causing the call to be rejected.

If the token is acceptable, the first Gatekeeper creates and stores an access request message directed to the authentication server, as shown by block 526. In one embodiment, block 526 involves creating and formatting a RADIUS Access Request packet using values of attributes that are appropriate to verify a CHAP Challenge. The first gatekeeper then sends the access request message to an authentication server, as shown by block 530.

Figure 5B:
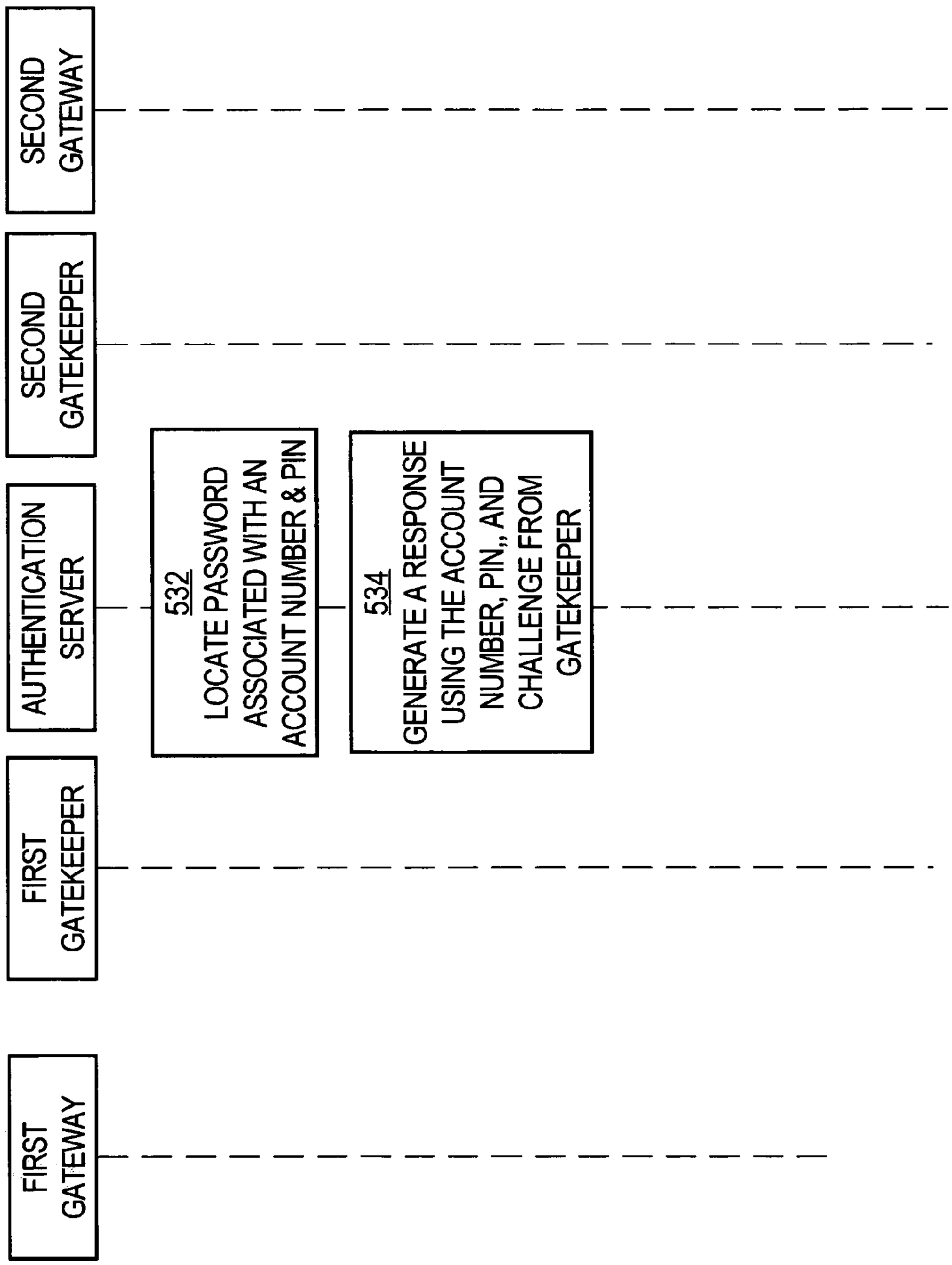
FIG. 5B is a block diagram of a part of a process of connecting a VoIP call between a first Gateway and a second Gateway using Admission Security.

Referring now to FIG. 5B, in block 532, assuming that the user account number is known at the authentication server, the authentication server locates a PIN that is associated with such account number. The authentication server then generates a CHAP Response based on the account number and PIN of the user, and the CHAP Challenge value that the authentication server has received from the first Gatekeeper, as shown by block 534.

Figure 5C:
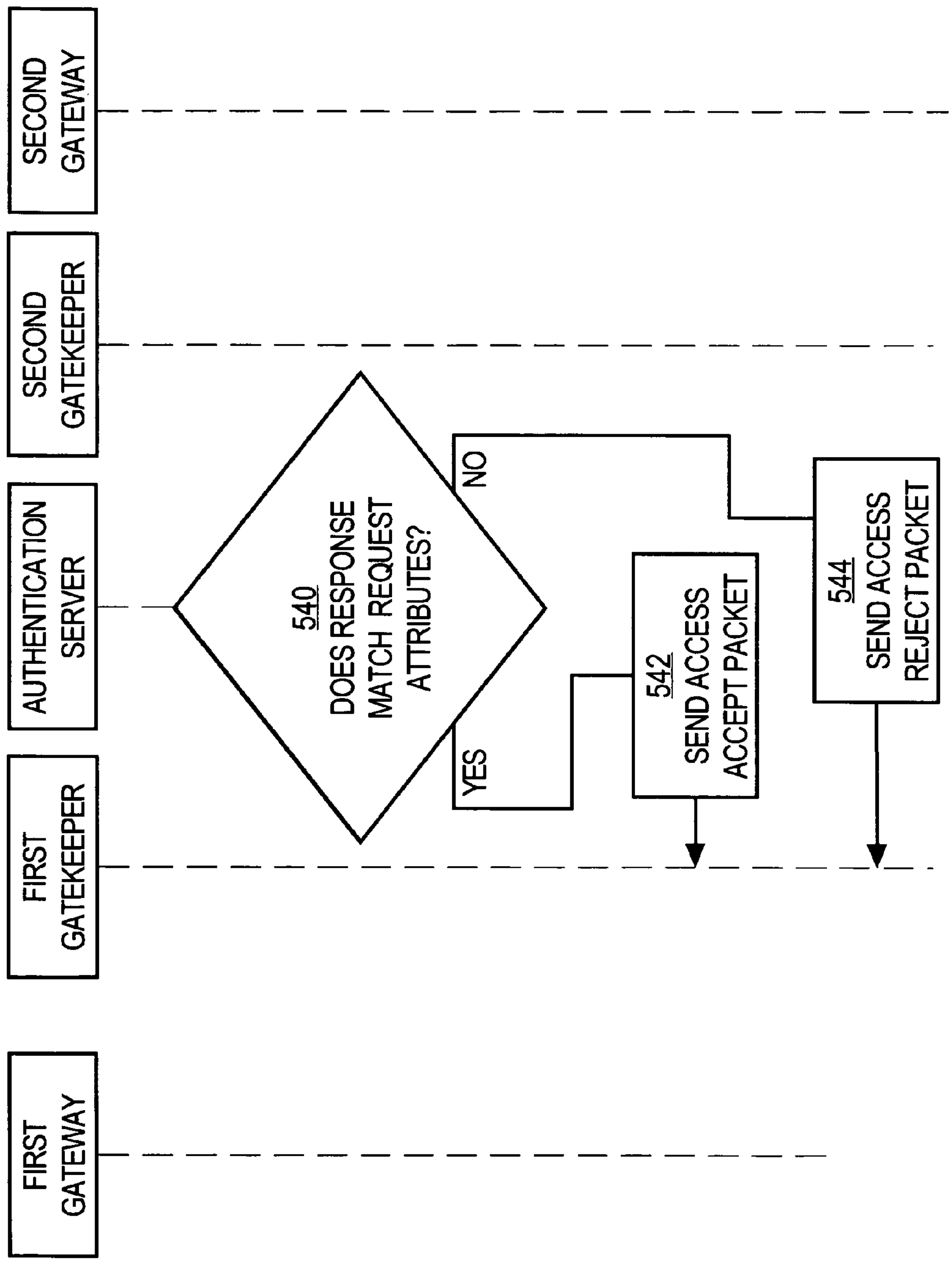
FIG. 5C is a block diagram of a part of a process of connecting a VoIP call between a first Gateway and a second Gateway using Admission Security.

As shown in FIG. 5C, if the CHAP Response matches the CHAP Challenge that is received from the first Gatekeeper in the Access Token, as tested in block 540, the authentication server sends an Access Accept message to the Gatekeeper, as shown by block 542. If there is no match, or if the user account number is not in the database of the authentication server, it sends an Access Reject message back to the first Gatekeeper, as shown by block 544.

Figure 5D:
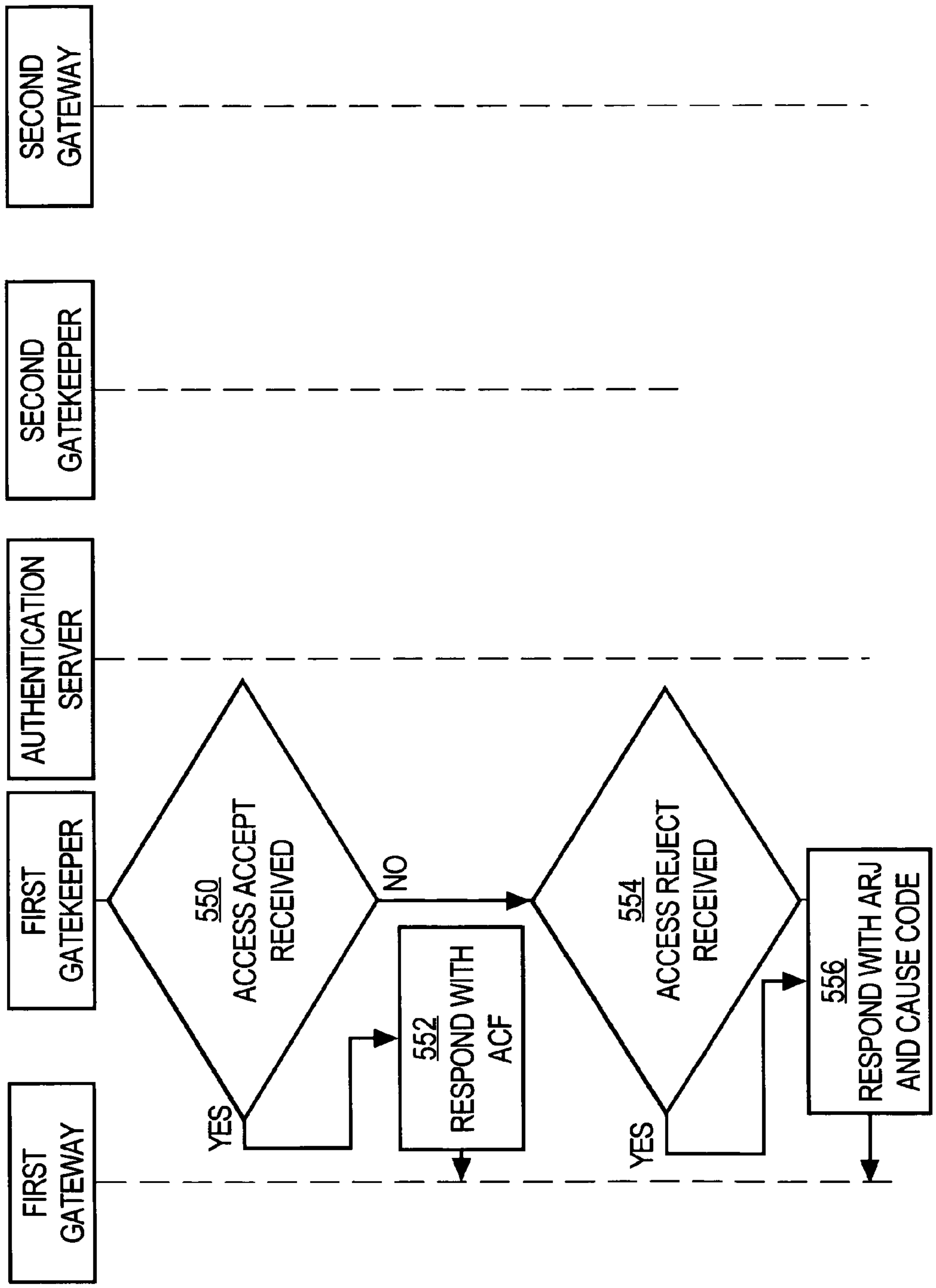
FIG. 5D is a block diagram of a part of a process of connecting a VoIP call between a first Gateway and a second Gateway using Admission Security.

Referring now to FIG. 5D, the first Gatekeeper determines whether it has received an Access Accept message, as shown by block 550, or an Access Reject message, as shown by block 554. If an Access Accept message is received, then the first Gatekeeper responds to the first Gateway with an ACF message, as shown by block 552. If it received an Access Reject message, then in block 556 the first Gatekeeper responds to the first Gateway with an ARJ message, and a cause code that indicates that a security denial occurred.

Figure 5E:
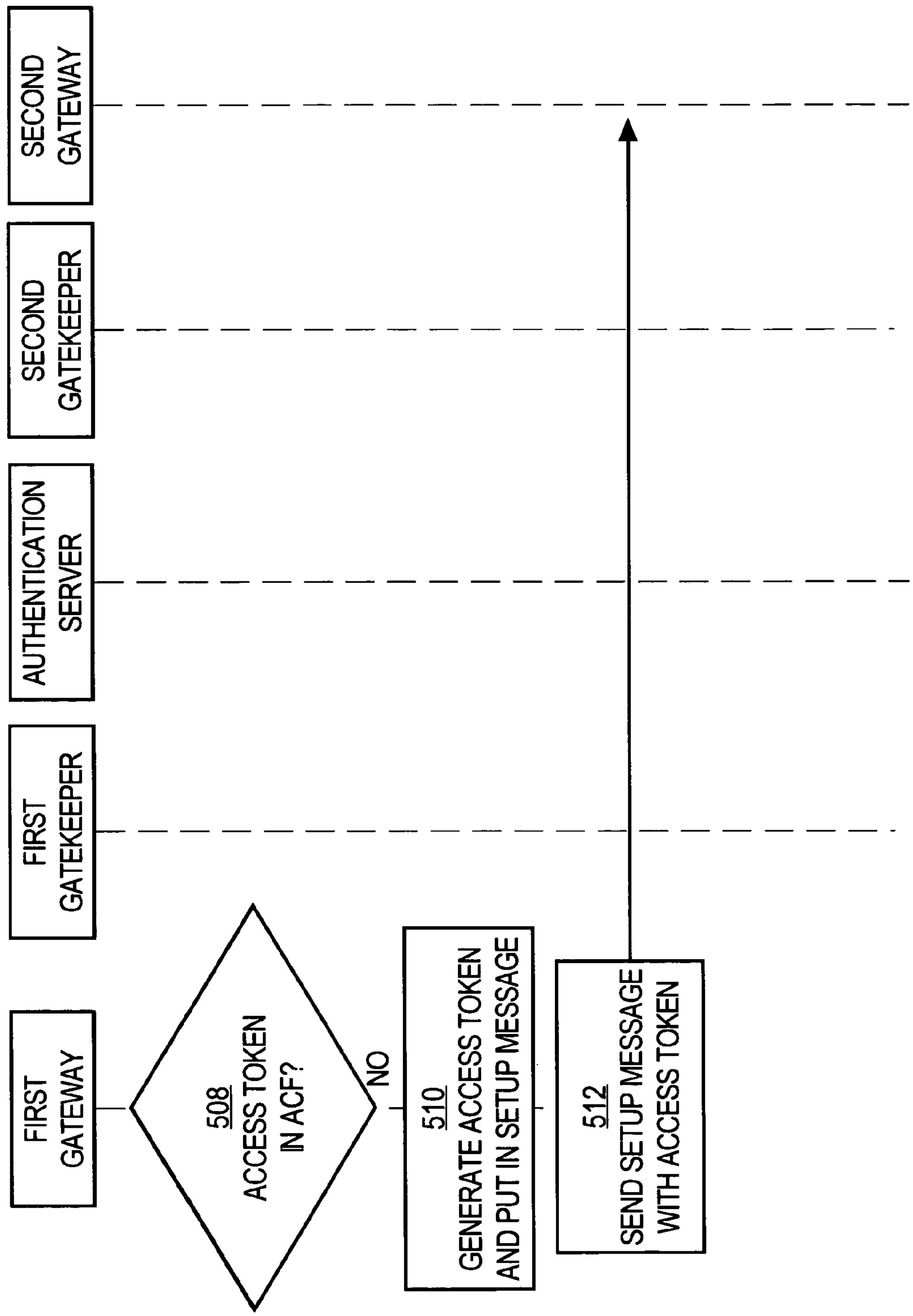
FIG. 5E is a block diagram of a part of a process of connecting a VoIP call between a first Gateway and a second Gateway using Admission Security.

As depicted in FIG. 5E, when the first Gateway receives the ACF message, the first Gateway determines whether the ACF message already contains an access token of some kind, as indicated by block 508. The presence of another kind of access token is taken to indicate that the security protocol described herein is not in use, and in response to detection of such an access token, the message flow terminates or returns. If there is no access token currently present in the ACF message, the first Gateway generates an Access Token based on a password of that Gateway, an alias of that Gateway (e.g., its H.323 identifier), and the current time. The generated Access Token is stored in the CCB. The first Gateway then retrieves the Access Token from the CCB and places it in clearToken within the SETUP message, as shown in block 510. In block 512, the first Gateway sends the SETUP message to the second (terminating) Gateway.

Figure 5F:
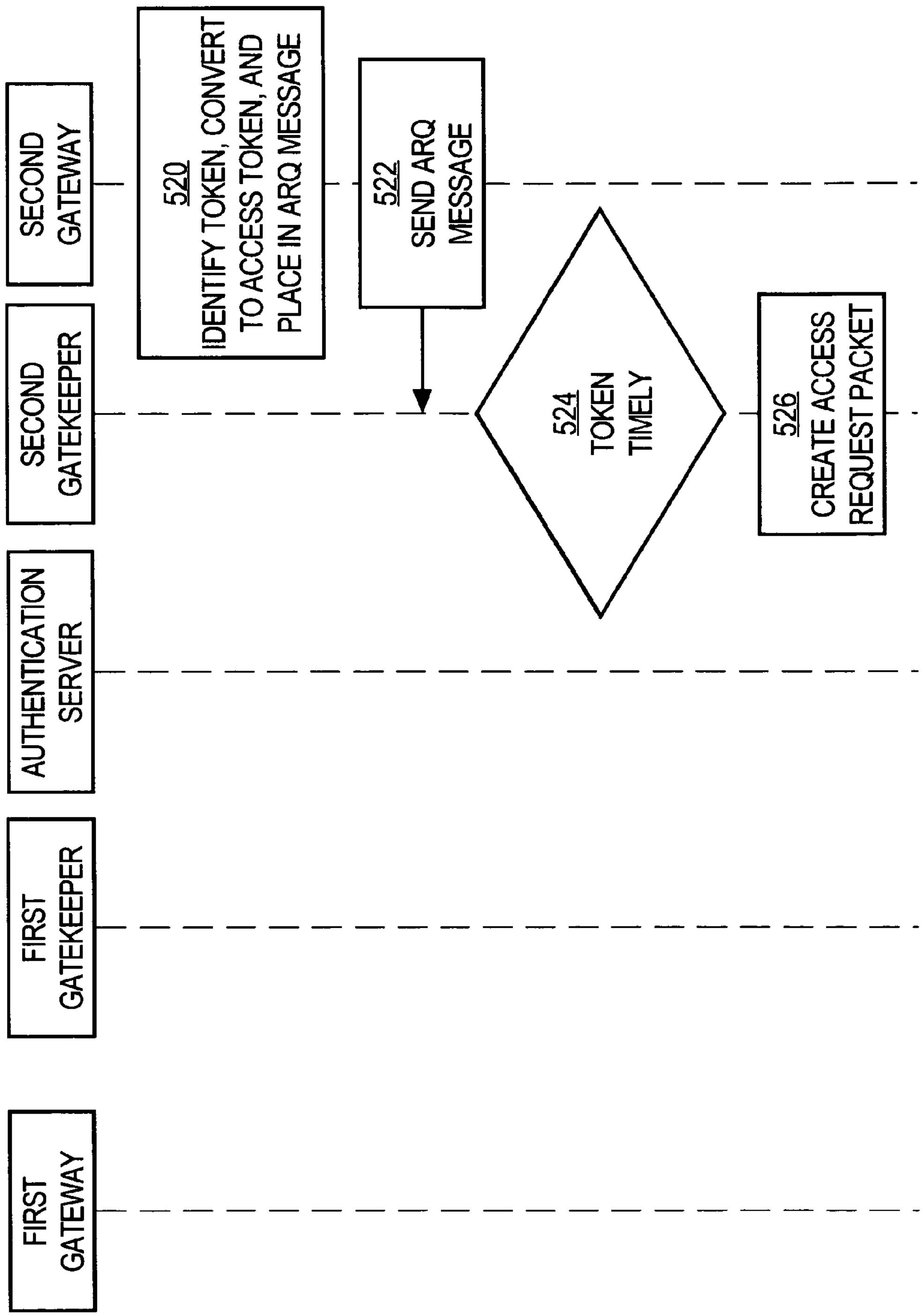
FIG. 5F is a block diagram of a part of a process of connecting a VoIP call between a first Gateway and a second Gateway using Admission Security.
Figure 5G:
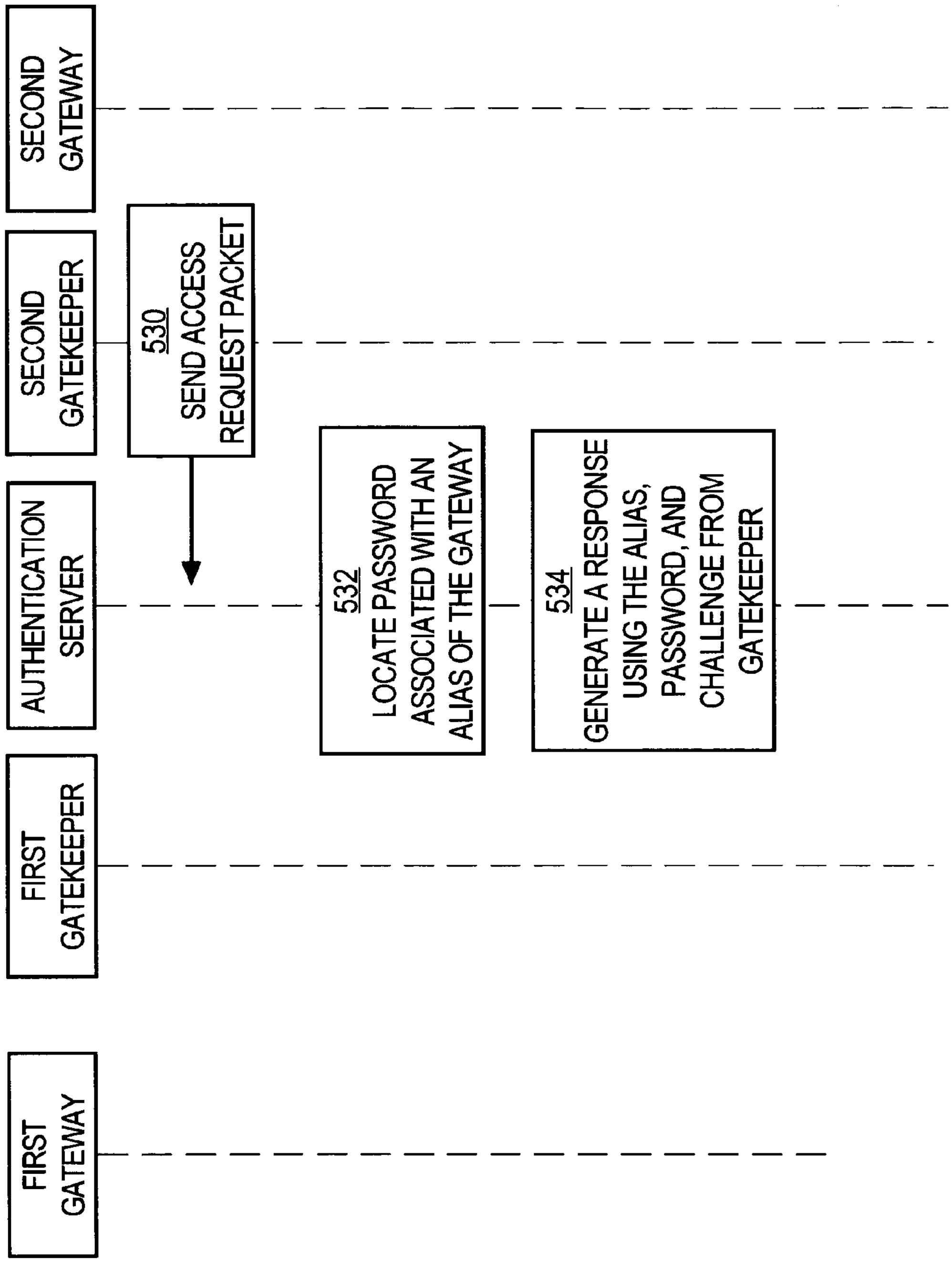
FIG. 5G is a block diagram of a part of a process of connecting a VoIP call between a first Gateway and a second Gateway using Admission Security.

Referring now to FIG. 5F, block 520, upon receiving the SETUP message, the terminating Gateway identifies and removes the clearToken from the SETUP message and places it in an ARQ message. In block 522, the terminating Gateway sends the ARQ message to the second (terminating) Gatekeeper.

In block 524, the second Gatekeeper determines whether the Access Token has been received in a timely manner. For example, the second Gatekeeper checks the timestamp value of the token to determine whether it is within an acceptable interval of time relative to the current time at the second Gatekeeper. For example, an acceptable time interval is 30 seconds before the current time of the second Gatekeeper. A token having a time stamp value outside such range causes the second Gatekeeper to discard the message, thereby causing the call to be rejected.

If the token is acceptable, the second Gatekeeper sends an access request message directed to the authentication server, as shown by block 526. In one embodiment, block 526 involves creating and formatting a RADIUS Access Request packet using values of attributes that are appropriate to verify a CHAP Challenge. The second gatekeeper then sends the access request message to an authentication server, as shown by block 530 of FIG. 5G. Referring again to FIG. 5G, in block 532, assuming that the alias of the first Gateway is known at the authentication server, the authentication server locates a password that is associated with such alias. The authentication server then generates a CHAP Response based on the alias and password of the first Gateway, and the CHAP Challenge value that the authentication server has received from the Gatekeeper, as shown by block 534.

Figure 5H:
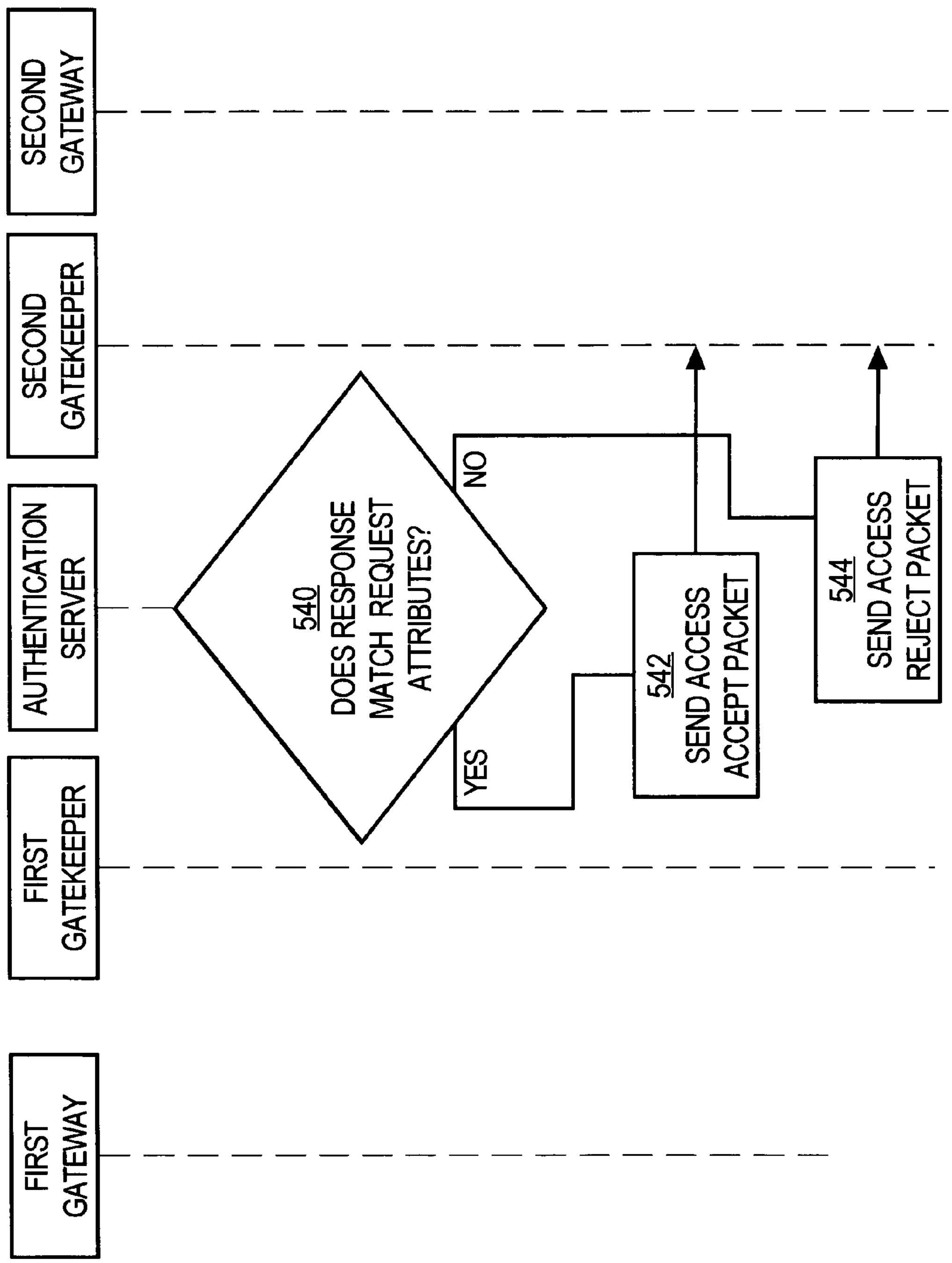
FIG. 5H is a block diagram of a part of a process of connecting a VoIP call between a first Gateway and a second Gateway using Admission Security.

As FIG. 5H shows, if the CHAP Response matches the CHAP Challenge that is received from the second Gatekeeper in the Access Token, as tested in block 540, the authentication server sends an Access Accept packet to the Gatekeeper, as shown by block 542. If there is no match, or if the alias of the first Gateway is not in the server's database, the server sends an Access Reject packet back to the second Gatekeeper, as shown by block 544.

Figure 5J:
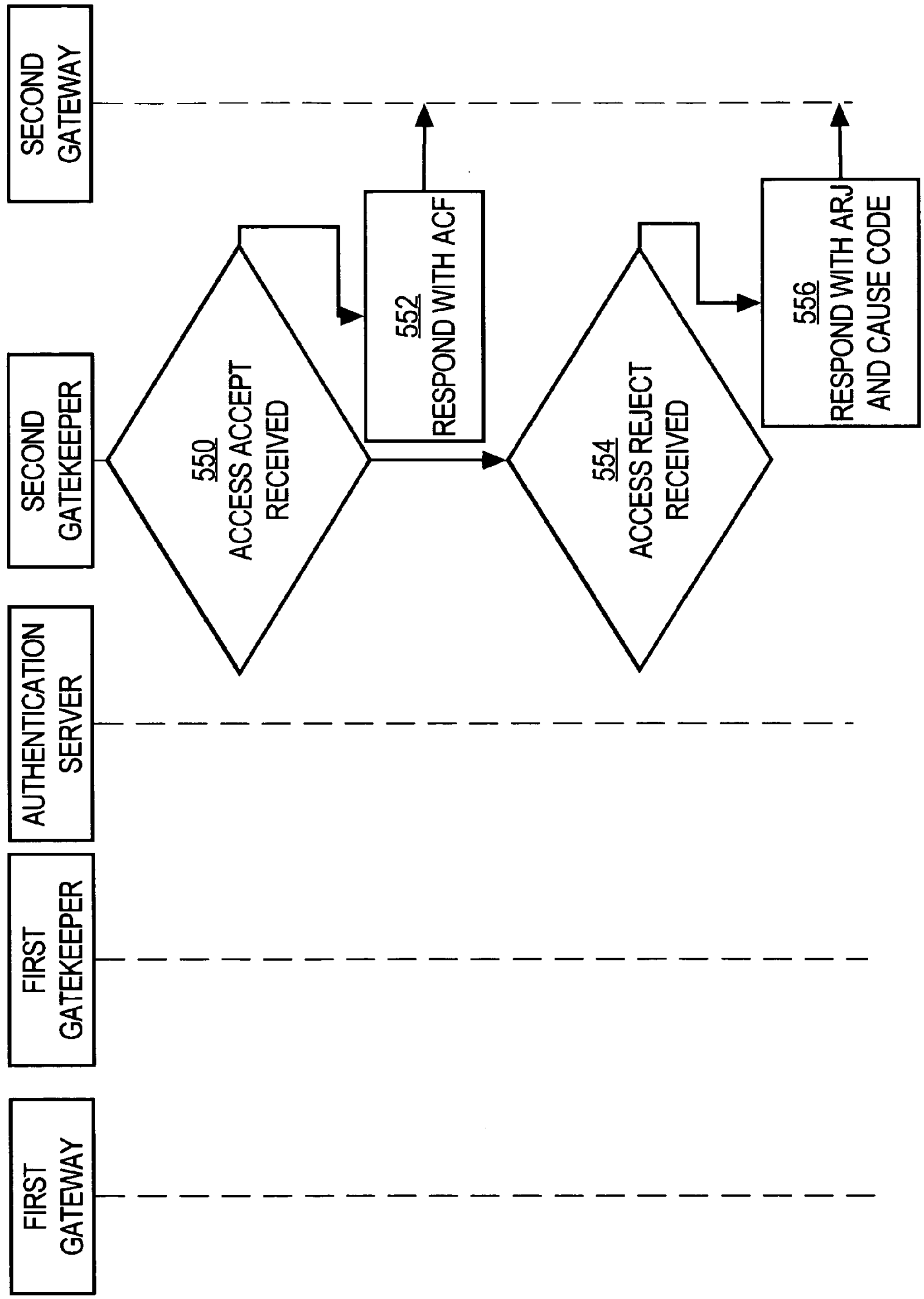
FIG. 5J is a block diagram of a part of a process of connecting a VoIP call between a first Gateway and a second Gateway using Admission Security.

Referring now to FIG. 5J, the second Gatekeeper determines whether it has received an Access Accept message, as shown by block 550, or an Access Reject message, as shown by block 554. If an Access Accept message is received, then the second Gatekeeper responds to the second Gateway with an ACF message, as shown by block 552. If it received an Access Reject message, then in block 556 the second Gatekeeper responds to the second Gateway with an ARJ message, and a cause code that indicates that a security denial occurred.

Figure 5K:
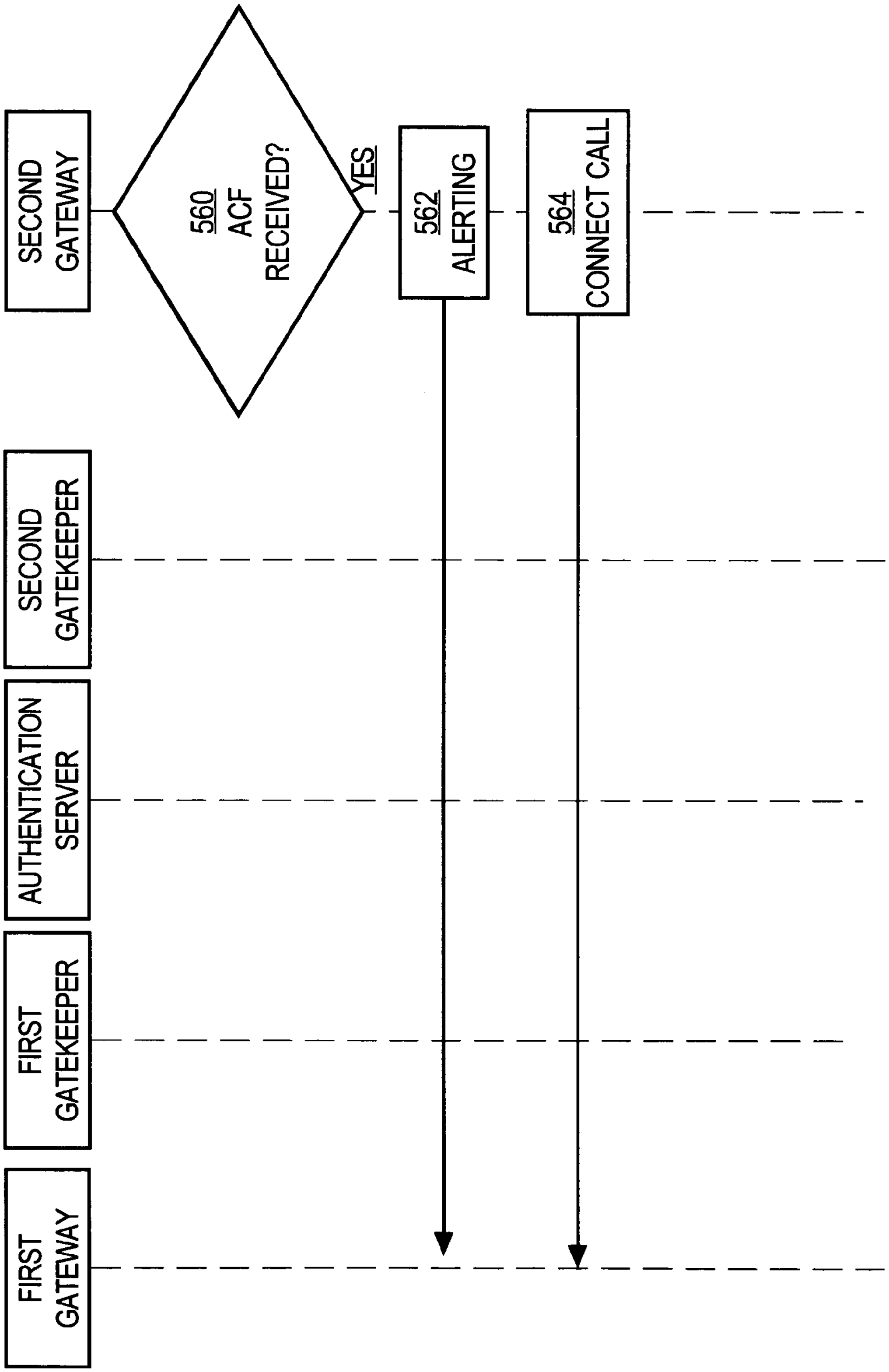
FIG. 5K is a block diagram of a part of a process of connecting a VoIP call between a first Gateway and a second Gateway using Admission Security.

As indicated in FIG. 5K, in block 560, the second Gateway determines whether it has received an ACF message. If so, then the call is connected. In one embodiment, connecting a call involves sending an Alerting message 562 and a Connect Call message 564 from the second Gateway to the first Gateway.

Data Structures

In one specific embodiment, the data structure definitions of the H.235 recommendation are modified as set forth in Table 2 in order to accommodate the token information described herein.

TABLE 2

DATA STRUCTURE MODIFICATIONS

```
typedef struct CHALLENGE_S {
        int length;
        uchar value[16];
} CHALLENGE_T
typedef struct CLEAR_TOKEN_S
{
    struct CLEAR_TOKEN_S *nextP; /*pointer to the next in the linked
    list*/
    struct ObjectID_   *tokenOID;    /*mandatory*/
    TIME_UINT_ T timeStamp;    /*option*/
    char    *password;    /*option*/
    CLEAR_TOKEN_NON_STD_T* cltNonStdP; /* option */
    char    *general_id /* option */
    CHALLENGE_T challenge;        /* option */
    int    random_value;
    unsigned char    bit_mask;
#define   CLT_TIME_STAMP_PRESENT 0x08
#define   CLT_NSP_PRESENT       0x04
#define   CLT_GENERAL_ID_PRESENT              0x02
#define   CLT_PASSWORD_PRESENT                0x40
#define   CLT_CHALLENGE_PRESENT               0x20
#define   CLT_RANDOM_PRESENT                  0x10
} CLEAR_TOKEN_T;
```

Hardware Overview

Figure 6:
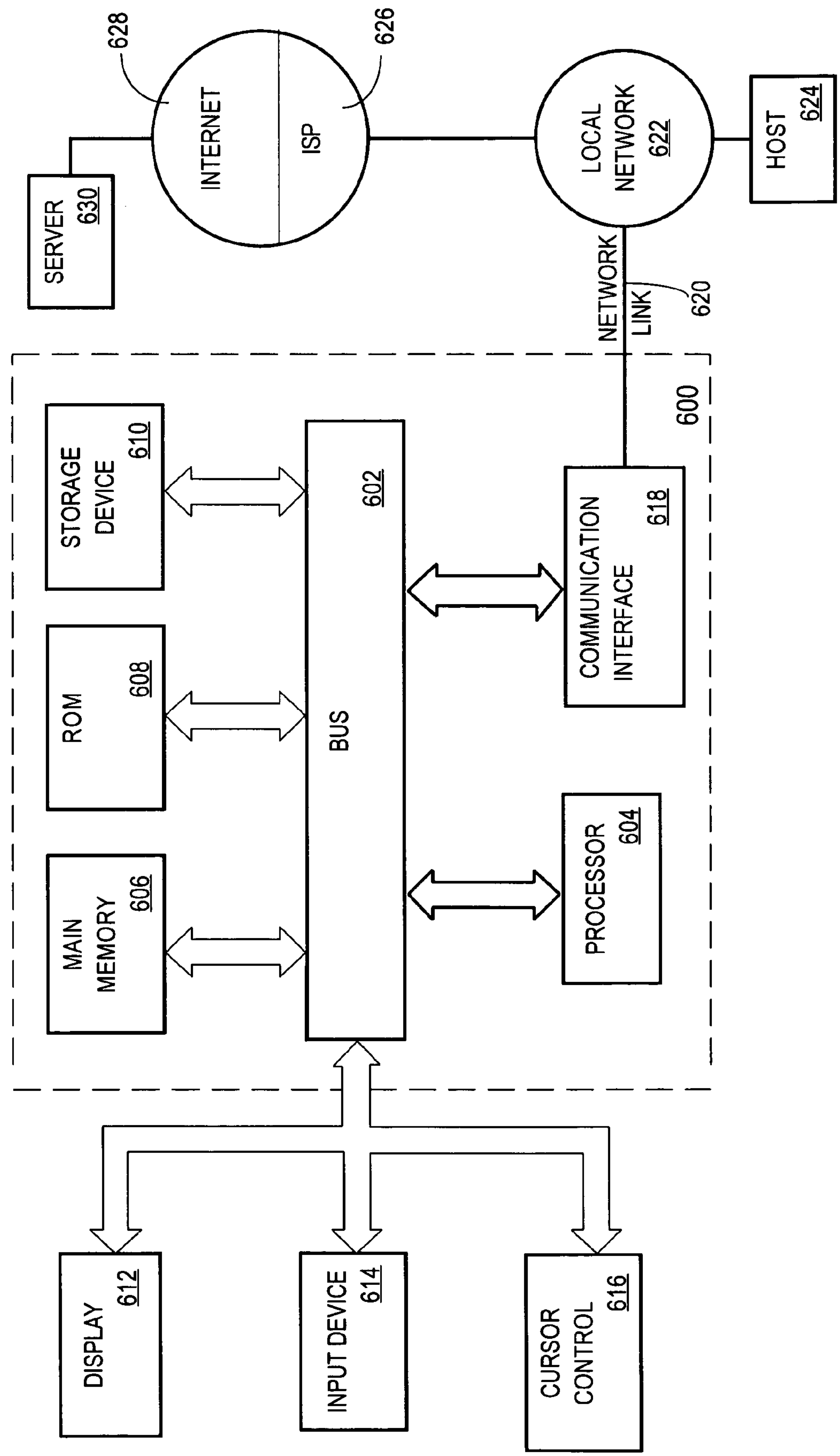
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for performing securely authenticating endpoints of a voice-over-Internet Protocol call connection. According to one embodiment of the invention, securely authenticating endpoints of a voice-over-Internet Protocol call connection is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for securely authenticating endpoints of a voice-over-Internet Protocol call connection as described herein.

The received code may be executed by processor 604 as it is received, and/or stored in storage device 610, or other non-volatile storage for later execution. In this manner, computer system 600 may obtain application code in the form of a carrier wave.

Scope

This method allows the same level of security as provided with H.235 cryptoTokens but allows embedded gatekeepers to off load the authentication to standard RADIUS servers. By using existing authentication, authorization, and access (AAA) technology to perform the actual authentication, the design of the Gatekeeper can be simplified and overall performance improved.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. For example, embodiments have been described with respect to authenticating endpoints such as Gateways. However, the invention is equally applicable to and useful in authenticating end users and other network elements.

What is claimed is:

1. A method of securely establishing a call between a first node of a voice over Internet Protocol call connection and a second node thereof, the method comprising the computer-implemented steps of:

receiving non-encrypted authentication request information that includes challenge information from the first node;

receiving, from an authentication server that is separate from but communicatively coupled to the second node, an authentication message indicating whether the first node is authenticated based on the non-encrypted authentication request information and including challenge response information generated by the authentication server; and establishing a call between the second node and the first node only when the authentication message indicates that the first node is authenticated at the authentication server.

2. A method as recited in claim 1, wherein the step of receiving non-encrypted authentication request information comprises the steps of receiving an access token comprising a general identifier value, a time stamp value, a challenge value, and a random value.

3. A method as recited in claim 1, wherein the step of receiving non-encrypted authentication request information comprises the steps of receiving an data comprising a general identifier value, a time stamp value, a challenge value, and a random value.

4. A method as recited in claim 1, wherein the step of receiving non-encrypted authentication request information further comprises the steps of:

determining whether the authentication request information was created within a specified interval of time with respect to a current time; and issuing a request for authentication to the authentication server only when the authentication request information was created within the specified interval of time with respect to the current time.

5. A method as recited in claim 1, further comprising the steps of:

receiving a password that is associated with the first node;

generating an authentication response based on the password and challenge information contained in the authentication request information;

determining whether the authentication response matches the authentication request information; and issuing authentication approval information in the authentication message only when the authentication response matches the authentication request information.

6. A method as recited in claim 1, further comprising the steps of:

receiving a password that is associated with the first node;

generating a Challenge Handshake Authentication Protocol (CHAP) response based on the password and implied CHAP challenge information contained in the authentication request information;

determining whether the authentication response matches the authentication request information based on CHAP; and issuing authentication approval information in the authentication message only when the authentication response matches the authentication request information based on CHAP.

7. A method of securely establishing a call in a voice over Internet Protocol call connection system that includes a first gateway at a call origination point, a first gatekeeper, a second gatekeeper, a second gateway at a call termination point, and an authentication server that is separate from but communicatively coupled to the first gatekeeper and the second gatekeeper, the method comprising the computer-implemented steps of:

receiving non-encrypted authentication request information from the first gateway;

receiving from the authentication server an authentication message that includes challenge response information generated by the authentication server and indicating whether the first gateway is authenticated based on the non-encrypted authentication request information that includes challenge information; and establishing a call between the second gateway and the first gateway only when the authentication message indicates that the first gateway is authenticated at the authentication server.

8. A method as recited in claim 7, wherein the step of receiving non-encrypted authentication request information comprises the steps of receiving an access token comprising a general identifier value, a time stamp value, a challenge value, and a random value.

9. A method as recited in claim 7, wherein the step of receiving non-encrypted authentication request information comprises the steps of receiving data comprising a general identifier value, a time stamp value, a challenge value, and a random value.

10. A method as recited in claim 7, further comprising the steps of:

receiving a password that is associated with the first gateway;

generating an authentication response based on the password and challenge information contained in the authentication request information;

determining whether the authentication response matches the authentication request information;

issuing authentication approval information in the authentication message to the second gatekeeper only when the authentication response matches the authentication request information; and issuing authentication rejection information in the authentication message to the second gatekeeper when the authentication response does not match the authentication request information.

11. A method as recited in claim 7, further comprising the steps of:

receiving a password that is associated with the first gateway;

generating a Challenge Handshake Authentication Protocol (CHAP) response based on the password and implied CHAP challenge information contained in the authentication request information;

determining whether the authentication response matches the authentication request information based on CHAP; and issuing authentication approval information in the authentication message only when the authentication response matches the authentication request information based on CHAP.

12. A method as recited in claim 7, further comprising the steps of:

receiving a call setup request message at the first gateway;

creating and storing the non-encrypted authentication request information based on the current time and information that uniquely identifies the first gateway; and requesting the second gateway to set up a call based on the authentication request information.

13. A method as recited in claim 12, further comprising the steps of:

determining whether the authentication request information was created within a specified interval of time with respect to a current time; at the second gatekeeper; and requesting the authentication server to carry out authentication of the first gateway only when the authentication request information was created within the specified interval of time with respect to the current time at the second gatekeeper.

14. A method as recited in claim 7, further comprising the steps of:

receiving a password that is associated with the first gateway;

generating an authentication response based on the password and challenge information contained in the authentication request information;

determining whether the authentication response matches the authentication request information; and issuing authentication approval information in the authentication message only when the authentication response matches the authentication request information.

15. A method as recited in claim 14, wherein the step of establishing a call between the second gateway and the first gateway comprises the step of establishing a call between the second gateway and the first gateway only when authentication approval information is received in the authentication message.

16. A method of securely establishing a call in a voice over Internet Protocol call connection system that includes a first gateway at a call origination point, a first gatekeeper, a second gatekeeper, a second gateway at a call termination point, and an authentication server that is separate from but communicatively coupled to the first gatekeeper and the second gatekeeper, the method comprising the computer-implemented steps of:

receiving user identification information from the first gateway that comprises a user identifier and a personal identification number that are uniquely associated with a calling party who originates a call using the first gateway;

receiving from the authentication server a first authentication message indicating whether the user identification information is authenticated based on first challenge response information generated by the authentication server;

receiving non-encrypted authentication request information that includes challenge information from the first gateway;

receiving from the authentication server a second authentication message indicating whether the first gateway is authenticated based on the non-encrypted authentication request information and second challenge response information generated by the authentication server; and establishing a call between the second gateway and the first gateway for the calling party only when the first authentication message indicates that the user identification information is authenticated and the second authentication message indicates that the first gateway is authenticated at the authentication server.

17. A method as recited in claim 16, wherein the step of receiving non-encrypted authentication request information comprises the steps of receiving an access token comprising a general identifier value, a time stamp value, a challenge value, and a random value.

18. A method as recited in claim 16, wherein the step of receiving non-encrypted authentication request information comprises the steps of receiving comprising a general identifier value, a time stamp value, a challenge value, and a random value.

19. A method as recited in claim 16, wherein the step of receiving non-encrypted authentication request information further comprises the steps of:

determining whether the authentication request information was created within a specified interval of time with respect to a current time; and issuing a request for authentication to the authentication server only when the authentication request information was created the specified interval of time with respect to the current time.

20. A method as recited in claim 16, further comprising the steps of:

receiving a password that is associated with the first gateway;

generating an authentication response based on the password and challenge information contained in the authentication request information;

determining whether the authentication response matches the authentication request information; and issuing authentication approval information in the authentication message only when the authentication response matches the authentication request information.

21. A method as recited in claim 16, further comprising the steps of:

receiving a password that is associated with the first gateway;

generating a Challenge Handshake Authentication Protocol (CHAP) response based on the password and implied CHAP challenge information contained in the authentication request information;

determining whether the authentication response matches the authentication request information based on CHAP; and issuing authentication approval information in the authentication message only when the authentication response matches the authentication request information based on CHAP.

22. A method as recited in claim 16, wherein the step of receiving non-encrypted user identification information further comprises the steps of:

determining whether the user identification information was created within a specified interval of time with respect to a current time; and issuing a request for authentication to the authentication server only when the user identification information was created within the specified interval of time with respect to the current time.

23. A method as recited in claim 16, further comprising the steps of:

retrieving a personal identification value that is associated with the user account number in the user identification information;

determining whether the personal identification value matches the personal identification number that is in the user identification information; and issuing authentication approval information in the authentication message only when the personal identification value matches the personal identification number that is in the user identification information.

24. A computer-readable medium carrying one or more sequences of instructions for securely establishing a call between a first node of a voice over Internet Protocol call connection and a second node thereof, which instructions, when executed by one or more processors, cause the one or more processors to carry out the steps of:

receiving non-encrypted authentication request information that includes challenge information from the first node;

receiving, from an authentication server that is separate from but communicatively coupled to the second node, an authentication message indicating whether the first node is authenticated based on the non-encrypted authentication request information and challenge response information generated by the authentication server; and establishing a call between the second node and the first node only when the authentication message indicates that the first node is authenticated at the authentication server.

25. A computer-readable medium as recited in claim 24, wherein the step of receiving non-encrypted authentication request information comprises the steps of receiving an access token comprising a general identifier value, a time stamp value, a challenge value, and a random value.

26. A computer-readable medium as recited in claim 24, wherein the step of receiving non-encrypted authentication request information comprises the steps of receiving data comprising a general identifier value, a time stamp value, a challenge value, and a random value.

27. A computer-readable medium as recited in claim 24, wherein the step of receiving non-encrypted authentication request information further comprises the steps of:

determining whether the authentication request information was created within a specified interval of time with respect to a current time; and issuing a request for authentication to the authentication server only when the authentication request information was created within the specified interval of time with respect to the current time.

28. A computer-readable medium as recited in claim 24, further comprising the steps of:

receiving a password that is associated with the first node;

generating an authentication response based on the password and challenge information contained in the authentication request information;

determining whether the authentication response matches the authentication request information;

issuing authentication approval information in the authentication message only when the authentication response matches the authentication request information.

29. A computer-readable medium as recited in claim 24, further comprising the steps of:

receiving a password that is associated with the first node;

generating a Challenge Handshake Authentication Protocol (CHAP) response based on the password and implied CHAP challenge information contained in the authentication request information;

determining whether the authentication response matches the authentication request information based on CHAP; and issuing authentication approval information in the authentication message only when the authentication response matches the authentication request information based on CHAP.

30. An apparatus for securely establishing a call between a first node of a voice over Internet Protocol call connection and a second node thereof, which instructions, comprising:

means for receiving non-encrypted authentication request information that includes challenge information from the first node;

means for receiving, from an authentication server that is separate from but communicatively coupled to the second node, an authentication message indicating whether the first node is authenticated based on the non-encrypted authentication request information and challenge response information generated by the authentication server; and means for establishing a call between the second node and the first node only when the authentication message indicates that the first node is authenticated at the authentication server.

31. An apparatus as recited in claim 30, wherein the means for receiving non-encrypted authentication request information comprises means for receiving an access token comprising a general identifier value, a time stamp value, a challenge value, and a random value.

32. An apparatus as recited in claim 30, wherein the means for receiving non-encrypted authentication request information comprises means for receiving data comprising a general identifier value, a time stamp value, a challenge value, and a random value.

33. An apparatus as recited in claim 30, wherein the means for receiving non-encrypted authentication request information further comprises:

means for determining whether the authentication request information was created within a specified interval of time with respect to a current time; and means for issuing a request for authentication to the authentication server only when the authentication request information was created within the specified interval of time with respect to the current time.

34. An apparatus as recited in claim 30, further comprising:

means for receiving a password that is associated with the first node;

means for generating an authentication response based on the password and challenge information contained in the authentication request information;

means for determining whether the authentication response matches the authentication request information; and means for issuing authentication approval information in the authentication message only when the authentication response matches the authentication request information.

35. An apparatus as recited in claim 30, further comprising:

means for receiving a password that is associated with the first node;

means for generating a Challenge Handshake Authentication Protocol (CHAP) response based on the password and implied CHAP challenge information contained in the authentication request information;

means for determining whether the authentication response matches the authentication request information based on CHAP; and means for issuing authentication approval information in the authentication message only when the authentication response matches the authentication request information based on CHAP.

36. An apparatus for securely establishing a call between a first node of a voice over Internet Protocol call connection and a second node thereof, comprising:

a network interface that is coupled to the data network for receiving one or more packet flows therefrom;

a processor;

one or more stored sequences of instructions which, when executed by the processor, cause the processor to carry out the steps of:

receiving non-encrypted authentication request information that includes challenge information from the first node;

receiving, from an authentication server that is separate from but communicatively coupled to the second node, an authentication message indicating whether the first node is authenticated based on the non-encrypted authentication request information and challenge response information generated by the authentication server; and establishing a call between the second node and the first node only when the authentication message indicates that the first node is authenticated at the authentication server.

37. An apparatus as recited in claim 36, wherein the step of receiving non-encrypted authentication request information comprises the steps of receiving an access token comprising a general identifier value, a time stamp value, a challenge value, and a random value.

38. An apparatus as recited in claim 36, wherein the step of receiving non-encrypted authentication request information comprises the steps of receiving an data comprising a general identifier value, a time stamp value, a challenge value, and a random value.

39. An apparatus as recited in claim 36, wherein the step of receiving non-encrypted authentication request information further comprises the steps of:

determining whether the authentication request information was created within a specified interval of time with respect to a current time; and issuing a request for authentication to the authentication server only when the authentication request information was created within the specified interval of time with respect to the current time.

40. An apparatus as recited in claim 36, further comprising one or more sequences of instructions which, when executed by the processor, cause the processor to carry out the steps of:

receiving a password that is associated with the first node;

generating an authentication response based on the password and challenge information contained in the authentication request information;

determining whether the authentication response matches the authentication request information; and issuing authentication approval information in the authentication message only when the authentication response matches the authentication request information.

41. An apparatus as recited in claim 36, further comprising one or more sequences of instructions which, when executed by the processor, cause the processor to carry out the steps of:

receiving a password that is associated with the first node;

generating a Challenge Handshake Authentication Protocol (CHAP) response based on the password and implied CHAP challenge information contained in the authentication request information;

determining whether the authentication response matches the authentication request information based on CHAP; and issuing authentication approval information in the authentication message only when the authentication response matches the authentication request information based on CHAP.

* * * * *

UNITED STATES PATENT AND TRADEMARK OFFICE

CERTIFICATE OF CORRECTION

PATENT NO. : 6,961,857 B1
DATED : November 1, 2005
INVENTOR(S) : Tyrone Floryanzia It is certified that error appears in the above-identified patent and that said Letters Patent is hereby corrected as shown below:

<u>Column 17,</u>
Line 17, delete "receiving an data" and insert -- receiving data --.

<u>Column 19,</u>
Line 59, delete "receiving comprising" and insert -- receiving data comprising --.

<u>Column 23,</u>
Line 8, delete "receiving an data" and insert -- receiving data --.

Signed and Sealed this

Twenty-fourth Day of January, 2006

JON W. DUDAS
*Director of the United States Patent and Trademark Office*